(12) United States Patent
Petrovic et al.

(10) Patent No.: US 7,573,397 B2
(45) Date of Patent: Aug. 11, 2009

(54) SYSTEM AND METHOD FOR DOWNHOLE TELEMETRY

(75) Inventors: John Petrovic, Calgary (CA); Victor Petrovic, Calgary (CA); Steven J. Braisher, Calgary (CA)

(73) Assignee: Mostar Directional Technologies Inc, Calgary (CA)

( * ) Notice: Subject to any disclaimer, the term of this patent is extended or adjusted under 35 U.S.C. 154(b) by 520 days.

(21) Appl. No.: 11/538,277

(22) Filed: Oct. 3, 2006

(65) Prior Publication Data

US 2007/0247329 A1 Oct. 25, 2007

(30) Foreign Application Priority Data

Apr. 21, 2006 (CA) .................................... 2544457

(51) Int. Cl.
*G01V 3/00* (2006.01)
(52) U.S. Cl. .................. 340/854.6; 340/854.4; 367/83; 175/40
(58) Field of Classification Search .............. 340/854.4, 340/854.6; 367/83; 175/40
See application file for complete search history.

(56) References Cited

U.S. PATENT DOCUMENTS

| | | | |
|---|---|---|---|
| 4,160,970 A | 7/1979 | Nicolson | |
| 4,901,289 A | 2/1990 | Cretin et al. | |
| 4,945,761 A | 8/1990 | Lessi et al. | |
| 5,138,313 A | 8/1992 | Barrington | |
| 5,160,925 A | 11/1992 | Dailet et al. | |
| 5,602,541 A | 2/1997 | Comeau et al. | |
| 5,749,605 A | 5/1998 | Hampton, III et al. | |
| 5,899,958 A | 5/1999 | Dowell et al. | |
| 5,924,499 A | 7/1999 | Birchak et al. | |
| 5,945,923 A | 8/1999 | Soulier | |
| 6,050,353 A | 4/2000 | Logan et al. | |
| 6,098,727 A | 8/2000 | Ringgenberg et al. | |
| 6,144,316 A | 11/2000 | Skinner | |
| 6,158,532 A | 12/2000 | Logan et al. | |
| 6,177,882 B1 | 1/2001 | Ringgenberg et al. | |

(Continued)

FOREIGN PATENT DOCUMENTS

CA 1255358 A 6/1989

(Continued)

*Primary Examiner*—Albert K Wong
(74) *Attorney, Agent, or Firm*—Brett J. Slaney; Santosh K. Chari; Blake, Cassels & Graydon LLP

(57) ABSTRACT

A system and method are provided for providing electromagnetic (EM) measurement-while-drilling (MWD) telemetry capabilities using an existing mud-pulse MWD tool. An EM tool intercepts the output from the mud-pulse tool and generates an EM signal that mimics a mud-pulse pressure signal. The EM signal is intercepted at the surface by a receiver module that conditions the signal and inputs the signal into the existing pulse tool receiver. Since the EM signal mimics a mud-pulse signal, the pulse tool receiver does not require software or hardware modifications in order to process an EM telemetry mode. The EM tool can be adapted to also provide dual telemetry by incorporating a conventional pressure pulser that would normally be used with the pulse tool. A gap sub assembly for isolating the drill string is also provided that includes a pair of subs whose shoulders are separated by a non-conductive ceramic material and whose threads are separated by an insulative material, preferably a Kevlar™ cloth.

55 Claims, 14 Drawing Sheets

U.S. PATENT DOCUMENTS

| | | |
|---|---|---|
| 6,404,350 B1 | 6/2002 | Soulier |
| 6,414,905 B1 | 7/2002 | Owens et al. |
| 6,572,152 B2 | 6/2003 | Dopf et al. |
| 6,727,827 B1 | 4/2004 | Edwards et al. |
| 6,736,222 B2 | 5/2004 | Kuckes et al. |
| 6,856,255 B2 | 2/2005 | Chalitsios et al. |
| 6,909,667 B2 | 6/2005 | Shah et al. |
| 6,926,098 B2 | 8/2005 | Peter |
| 6,937,159 B2 | 8/2005 | Hill et al. |
| 7,080,699 B2 | 7/2006 | Lovell et al. |
| 7,255,183 B2 | 8/2007 | Cramer |
| 2004/0104047 A1 | 6/2004 | Peter |
| 2006/0202852 A1 | 9/2006 | Peter et al. |
| 2006/0220650 A1 | 10/2006 | Lovell et al. |
| 2007/0052551 A1 | 3/2007 | Lovell et al. |

FOREIGN PATENT DOCUMENTS

| | | | |
|---|---|---|---|
| CA | 1301328 C | | 5/1992 |
| CA | 2209423 A1 | | 1/1998 |
| CA | 2078090 C | | 2/1999 |
| CA | 2282810 A1 | | 3/2000 |
| CA | 2323654 A1 | | 4/2001 |
| CA | 2329454 | | 6/2001 |
| CA | 2096941 C | | 7/2001 |
| CA | 2392670 A1 | | 7/2001 |
| CA | 2436056 A1 | | 9/2002 |
| CA | 2455396 | | 1/2003 |
| CA | 2411083 A1 | | 5/2003 |
| CA | 2476259 A1 | | 8/2003 |
| CA | 2260307 | | 12/2003 |
| CA | 2442475 A1 | | 3/2004 |
| CA | 2499331 A1 | | 4/2004 |
| CA | 2508374 A1 | | 6/2004 |
| CA | 2506808 | | 7/2004 |
| CA | 2420402 | | 8/2004 |
| CA | 2515193 A1 | | 8/2004 |
| CA | 2232213 | | 9/2004 |
| CA | 2469574 | | 12/2004 |
| CA | 2471067 A1 | | 12/2004 |
| CA | 2201552 C | | 1/2005 |
| CA | 2476370 | | 1/2005 |
| CA | 2476521 A1 | | 2/2005 |
| CA | 2495170 A1 | | 7/2005 |
| CA | 2460371 A1 | | 9/2005 |
| CA | 2249300 | | 10/2005 |
| CA | 2261686 C | | 2/2006 |
| CA | 2496170 A1 | | 8/2006 |
| CA | 2552514 | | 2/2007 |
| WO | WO 00/13349 A1 | | 3/2000 |
| WO | WO 2004/061269 A1 | | 7/2004 |

SYSTEM AND METHOD FOR DOWNHOLE TELEMETRY

This application claims priority from Canadian Patent Application No. 2,544,457 filed on Apr. 21, 2006.

FIELD OF THE INVENTION

The present invention relates generally to data acquisition during earth drilling operations and telemetry systems therefor, and has particular utility in measurement while drilling (MWD) applications.

DESCRIPTION OF THE PRIOR ART

The recovery of subterranean materials such as oil and as typically requires drilling wellbores a great distance beneath the earth's surface towards a repository of the material. The earthen material being drilled is often referred to as "formation". In addition to drilling equipment situated at the surface, a drill string extends from the equipment to the material formation at the terminal end of the wellbore and includes a drill bit for drilling the wellbore.

The drill bit is rotated and drilling is accomplished by either rotating the drill string or by use of a downhole motor near the drill bit. Drilling fluid, often termed "mud", is pumped down through the drill string at high pressures and volumes (e.g. 3000 p.s.i. at flow rates of up to 1400 gallons per minute) to emerge through nozzles or jets in the drill bit. The mud then travels back up the hole via the annulus formed between the exterior of the drill string and the wall of the wellbore. On the surface, the drilling mud may be cleaned and then re-circulated. The drilling mud serves to cool and lubricate the drill bit, to carry cuttings from the base of the bore to the surface, and to balance the hydrostatic pressure in the formation.

A drill string is generally comprised of a number of drill rods that are connected to each other in seriatim. A drill rod is often referred to as a "sub", and an assembly of two or more drill rods may be referred to as a "sub-assembly".

It is generally desirable to obtain information relating to parameters and conditions downhole while drilling. Such information typically relates to one or more characteristics of the earth formation that is being traversed by the wellbore such as data related to the size depth and/or direction of the wellbore itself, and information related to the drill bit such as temperature, speed and fluid pressure. The collection of information relating to conditions downhole, commonly referred to as "logging", can be performed using several different methods. Well logging in the oil industry has been known for many years as a technique for providing information to the driller regarding the particular earth formation being drilled.

In one logging technique, a probe or "sonde" that houses formation sensors is lowered into the wellbore once drilling has progressed or completed. The probe is supported by and connected to the surface via an electrical wireline, and is used to obtain data and send the data to the surface. A paramount problem with obtaining downhole measurements via a wireline is that the drilling assembly must be removed or "tripped" from the wellbore before the probe can be lowered into the wellbore to obtain the measurements. Tripping a drill string is typically time consuming and thus costly, especially when a substantial portion of the wellbore has been drilled.

To avoid tripping the drill string, there has traditionally been an emphasis on the collection of data during the drilling process. By collecting and processing data during the drilling process, without the necessity of tripping the drill string, the driller can make modifications or corrections to the drilling process as necessary. Such modifications and corrections are typically made in an attempt to optimize the performance of the drilling operation while minimizing downtime. Techniques for concurrently drilling the well and measuring downhole conditions are often referred to as measurement-while-drilling (MWD). It should be understood that MWD will herein encompass logging-while-drilling (LWD) and seismic-while-drilling (SWD) techniques, wherein LWD systems relate generally to measurements of parameters of earth formation, and SWD systems relate generally to measurements of seismic related properties.

In MWD systems, sensors or transducers are typically located at the lower end of the drill string which, while drilling is in progress, continuously or intermittently monitor predetermined drilling parameters and formation data. Data representing such parameters may then be transmitted to a surface detector/receiver using some form of telemetry. Typically, the downhole sensors employed in MWD applications are positioned in a cylindrical drill collar that is positioned as close to the drill bit as possible.

There are a number of telemetry techniques that have been employed by MWD systems to transmit measurement data to the surface without the use of a wireline tool.

One such technique involves transmitting data using pressure waves in drilling fluids such as drilling mud. This telemetry scheme is often referred to as mud-pulse telemetry Mud-pulse telemetry involves creating pressure signals in the drilling mud that is being circulated under pressure through the drill string during the drilling operation. The information that is acquired by the downhole sensors is transmitted utilizing a particular time division scheme to effectively create a waveform of pressure pulses in the mud column. The information may then be received and decoded by a pressure transducer and analyzed by a computer at a surface receiver.

In a mud-pulse system, the pressure in the drilling mud is typically modulated via operation of a valve and control mechanism. Generally termed a pulser or mud-pulser. The pulser is typically mounted in a specially adapted drill collar positioned above the drill bit. The generated pressure pulse travels up the mud column inside the drill string at the velocity of sound in the mud, and thus the data transmission rate is dependent on the type of drilling fluid used. Typically, the velocity may vary between approximately 3000 and 5000 feet per second. The actual rate of data transmission, however, is relatively slow due to factors such as pulse spreading, distortion, attenuation, modulation rate limitations, and other disruptive forces such as ambient noise in the transmission channel. A typical pulse rate is on the order of one pulse per second (i.e. 1 Hz).

An often preferred implementation of mud-pulse telemetry uses pulse position modulation for transmitting data. In pulse position modulation, pulses have a fixed width and the interval between pulses is proportional to the data value transmitted. Mud-pressure pulses can be generated by opening and closing a valve near the bottom of the drill string so as to momentarily restrict the mud flow. In a number of known MWD tools, a "negative" pressure pulse is created in the fluid by temporarily opening a valve in the drill collar so that some of the drilling fluid will bypass the bit, the open valve allowing direct communication between the high pressure fluid inside the drill string and the fluid at lower pressure returning to the surface via the exterior of the string. Alternatively, a "positive" pressure pulse can be created by temporarily restricting the downward flow of drilling fluid by partially blocking the fluid path in the drill string.

Electromagnetic (EM) radiation has also been used to telemeter data from downhole locations to the surface (and vice-versa). In EM systems, a current may be induced on the drill string from a downhole transmitter and an electrical potential may be impressed across an insulated gap in a downhole portion of the drill string to generate a magnetic field that will propagate through the earth formation. The signal that propagates through the formation is typically measured using a conductive stake that is driven into the ground at some distance from the drilling equipment. The potential difference of the drill string signal and the formation signal may then be measured, as shown in U.S. Pat. No. 4,160,970 published on Jul. 10, 1979.

Information is transmitted from the downhole location by modulating the current or voltage signal and is detected at the surface with electric field and/or magnetic field sensors. In an often preferred implementation of EM telemetry, information is transmitted by phase shifting a carrier sine wave among a number of discrete phase states. Although the drill string acts as part of the conductive path, system losses are almost always dominated by conduction losses within the earth which, as noted above, also carries the electromagnetic radiation. Such EM systems work well in regions where the earth's conductivity between the telemetry transmitter and the earth's surface is consistently low. However, EM systems may be affected by distortion or signal dampening due to geologic formations such as dry coal seams, anhydrite, and salt domes.

Telemetry using acoustic transmitters in the drill string has also been contemplated as a potential means to increase the speed and reliability of the data transmission from downhole to the surface. When actuated by a signal such as a voltage potential from a sensor, an acoustic transmitter mechanically mounted on the tubing imparts a stress wave or acoustic pulse onto the tubing string.

Typically, drillers will utilize one of a wireline system, a mud-pulse system, an EM system and an acoustic system, most often either an EM system or a mud-pulse system. Depending on the nature of the drilling task, it is often more favourable to use EM due to its relatively faster data rate when compared to mud-pulse. However, if a signal is lost due to the presence of the aforementioned geological conditions, the rig must be shut down and the drill string tripped to swap the EM system with an alternative system such as a mud-pulse system which, although slower, is generally more reliable. The drill string would then need to be re-assembled and drilling restarted. The inherent downtime while tripping the drill string can often be considerable and thus undesirable.

In general, one problem associated with mud-pulse telemetry is that it can only be used during the drilling operation as it relies on the flow of mud in the mud-column. When drilling is interrupted, e.g. when adding a sub to the drill string there is no medium to transmit data.

It is therefore an object of the present invention to obviate or mitigate at least one of the above-mentioned disadvantages.

SUMMARY OF THE INVENTION

In one aspect, there is provided a method for transmitting data in a wellbore to a surface receiver, the wellbore having a drill string. The method comprises receiving a data signal indicative of at least one parameter acquired from at least one sensor; generating an electromagnetic (EM) signal according to information provided by the data signal, the EM signal being modulated to provide a substantially square waveform; and transmitting the EM signal to the surface receiver.

In another aspect, the data signal is provided by a mud-pulse tool and the surface receiver includes an EM receiver module for conditioning the EM signal and inputting the conditioned signal to the surface receiver module, wherein the surface receiver module operates according to mud-pulse telemetry.

In yet another aspect, there is provided a method for transmitting data in a wellbore to a surface receiver, the wellbore having a drill string. The method comprises receiving a data signal from a mud-pulse tool indicative of at least one parameter acquired from at least one sensor; generating an EM signal using an EM tool according to information provided by the data signal, the EM signal being modulated to provide a substantially square waveform; transmitting the EM signal to the surface receiver; instructing the EM tool to operate in a mud-pulse telemetry mode; redirecting the data signal to a mud-pulser; generating a sequence of pressure pulses using the mud-pulser according to the information provided by the data signal; transmitting the sequence of pressure pulses to a pressure transducer in fluid communication with the mud-pulser; and transmitting a second data signal from the pressure transducer to the surface receiver.

In yet another aspect, there is provided a measurement while drilling (MWD) tool for transmitting data in a wellbore, the wellbore having a drill string. The tool comprises a controller for receiving a data signal indicative of at least one parameter acquired from at least one sensor; a surface receiver; an EM transmitter for generating an EM signal according to information provided by the data signal, the EM signal being modulated to provide a substantially square waveform and being transmitted by the EM transmitter to the surface receiver; a mud-pulser for generating a sequence of pressure pulses according to information provided by the data signal and for transmitting the sequence of pressure pulses through a mud-column in the drill string to a pressure transducer, the pressure transducer being in communication with the surface receiver; and a switching mechanism interposed between the controller and the EM transmitter and the mud-pulser, the switching mechanism being capable of directing the data signal to either the EM transmitter or the mud-pulser in response to a control signal Generated by the controller.

In yet another aspect, there is provided an EM measurement while drilling (MWD) tool for transmitting data in a wellbore, the wellbore having a drill string. The tool comprises a controller for receiving a data signal indicative of at least one parameter acquired from at least one sensor; and an EM transmitter for generating an EM signal according to information provided by the data signal, the EM signal being modulated to provide a substantially square waveform and beings transmitted by the transmitter to a surface receiver.

In yet another aspect, there is provided a gap sub-assembly for electrically isolating an upstream portion of a drill string from a downstream portion of the drill string. The sub-assembly comprises a first sub and a second sub; a first non-conductive ring interposed between the first and second sub; and a first insulative layer interposed between respective threads of a male end of the first sub and a female end of the second sub; wherein the layer is applied to the male end of the first sub and the female end of the second sub is then connected to the male end, electrically isolating the respective threads.

In yet another aspect, the sub-assembly further comprises a third sub and a fourth sub; a second non-conductive ring interposed between the third and fourth sub; and a second insulative layer interposed between respective threads of a male end of the third sub and a female end of the fourth sub; wherein the second insulative layer is applied to the male end of the third sub and the female end of the fourth sub is then connected to the male end of the third sub, electrically isolating the respective threads of the third and fourth sub, and wherein the second sub is connected to the third sub.

In yet another aspect, the insulative layers are made from a woven fabric.

In yet another aspect, the ring of the sub-assembly is made from a ceramic material being one of Technox™ and YTZP-Hipped™.

BRIEF DESCRIPTION OF THE DRAWINGS

An embodiment of the invention will now be described by way of example only with reference to the appended drawing as wherein.

DETAILED DESCRIPTION OF THE INVENTION

Drilling Environment

Figure 1:
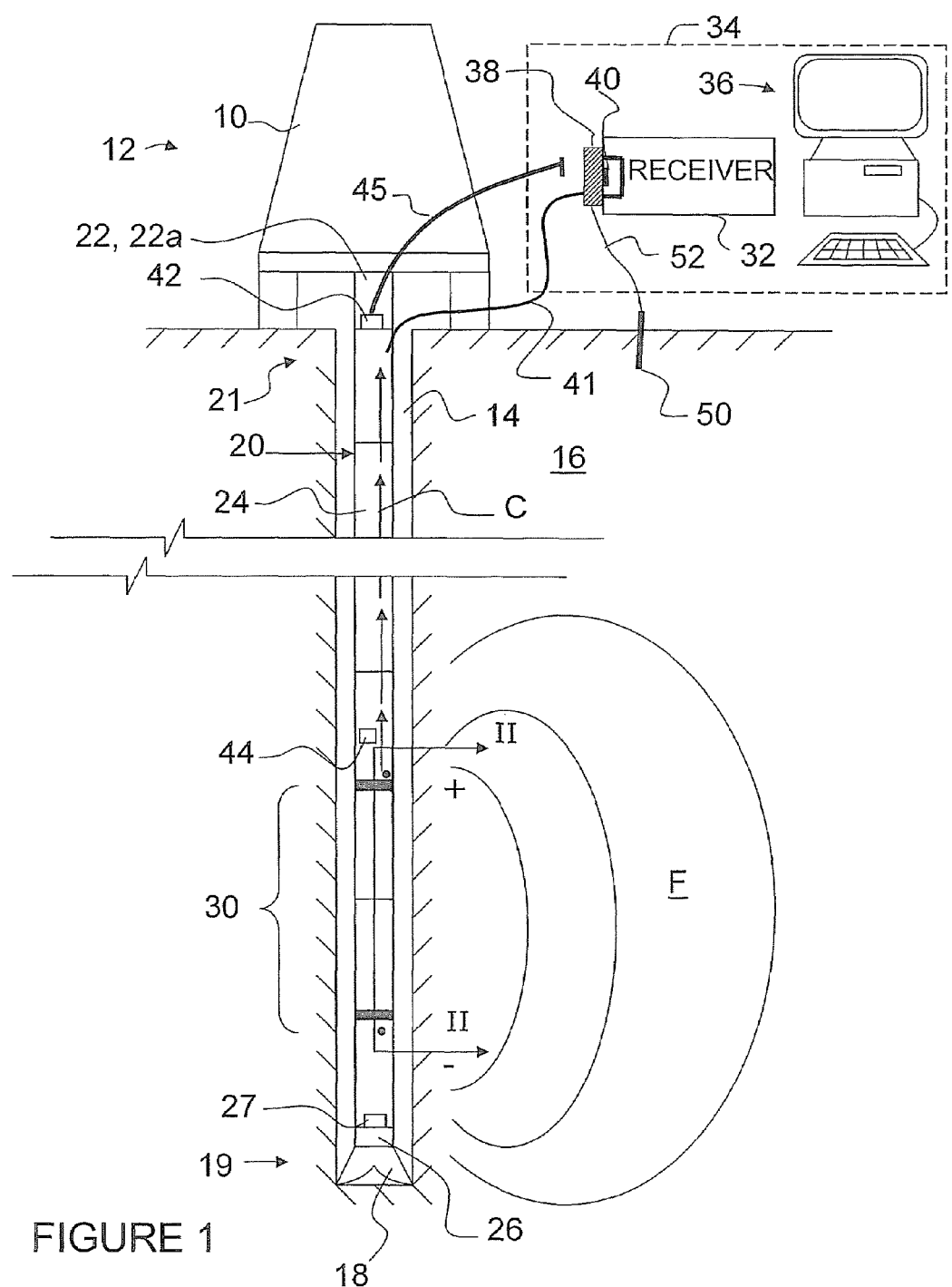
FIG. 1 is a schematic view of a drilling system and its environment.

Referring therefore to FIG. 1, a drilling rig 10 is shown in situ at a drilling site 12. The rig 10 drills a wellbore 14 into an earth formation 16. The wellbore 14 is excavated by operating a drill bit 18 disposed at a lower end 19 of a drill string 20. The drill string 20 is supported at an upper end 21 by drilling equipment 22. As the bit 18 drills into the formation 16, individual drill rods 24, hereinafter referred to as "subs", are added to the drill string 20 as required. In the example shown in FIG. 1, the drill bit 18 is driven by a fluid motor 26. The fluid motor 26 is powered by the drilling equipment 22 pumping drill fluid, hereinafter referred to as "mud", using, a mud motor 22a through a hollow conduit 28 (see FIG. 2) defined by interior portions of the connected subs 24. The column of fluid held in the conduit 28 will hereinafter be referred to as a "mud column" and generally denoted by the character "M".

An MWD tool 30 is located within the drill string 20 toward its lower end 19. The tool 30 transmits data indicative of parameters sensed by one or more sensors collectively denoted by numeral 27. In one embodiment, the tool 30 transmits the data to a pulse tool receiver 32 at the surface using EM telemetry. The EM transmission includes a signal C that is conducted through the drill string 20 and through a connection 41 to an EM receiver module 38.

The EM receiver module 38 is plugged into a port 40 included in the pulse tool receiver 32. A pressure transducer 42 is normally plugged into the port 40 and thus the interface between the receiver 32 and the module 38 is preferably similar to the interface between the receiver 32 and the transducer 42. The pressure transducer 42 includes a data cable 45 for connecting itself to the port 40. The tool 30 is adapted to operate using an existing pulse tool as will be explained in greater detail below.

The EM transmission also includes generating an electromagnetic field F which propagates outwardly and upwardly through the formation 16 to the surface, forming the electric field lines shown in FIG. 1. A conductive member 50, typically an iron stake driven into the formation 16, conducts the signal through connection 52 to the EM receiver module 38.

In another embodiment, the tool 30 also transmits the data to the surface receiver 32 through the mud column M by way of a series of pressure pulses (not shown) generated by a pulser 44. The pressure pulses are interpreted by the pressure transducer 42 and a voltage pulse indicative of the information transmitted by the pressure pulses is generated and transmitted over cable 45 to the receiver module 32. The pulser 44 and the pressure transducer 42 are fluidly connected through the mud column M.

The surface receiver 32 is typically located at an offsite location and provides an output indicative of the data that has been transmitted from the wellbore to a computing device 36. In this example a personal computer (PC) is used to gather and analyze the measured data that has been transmitted to the surface receiver 32.

Gap Sub-Assembly

Figure 2:
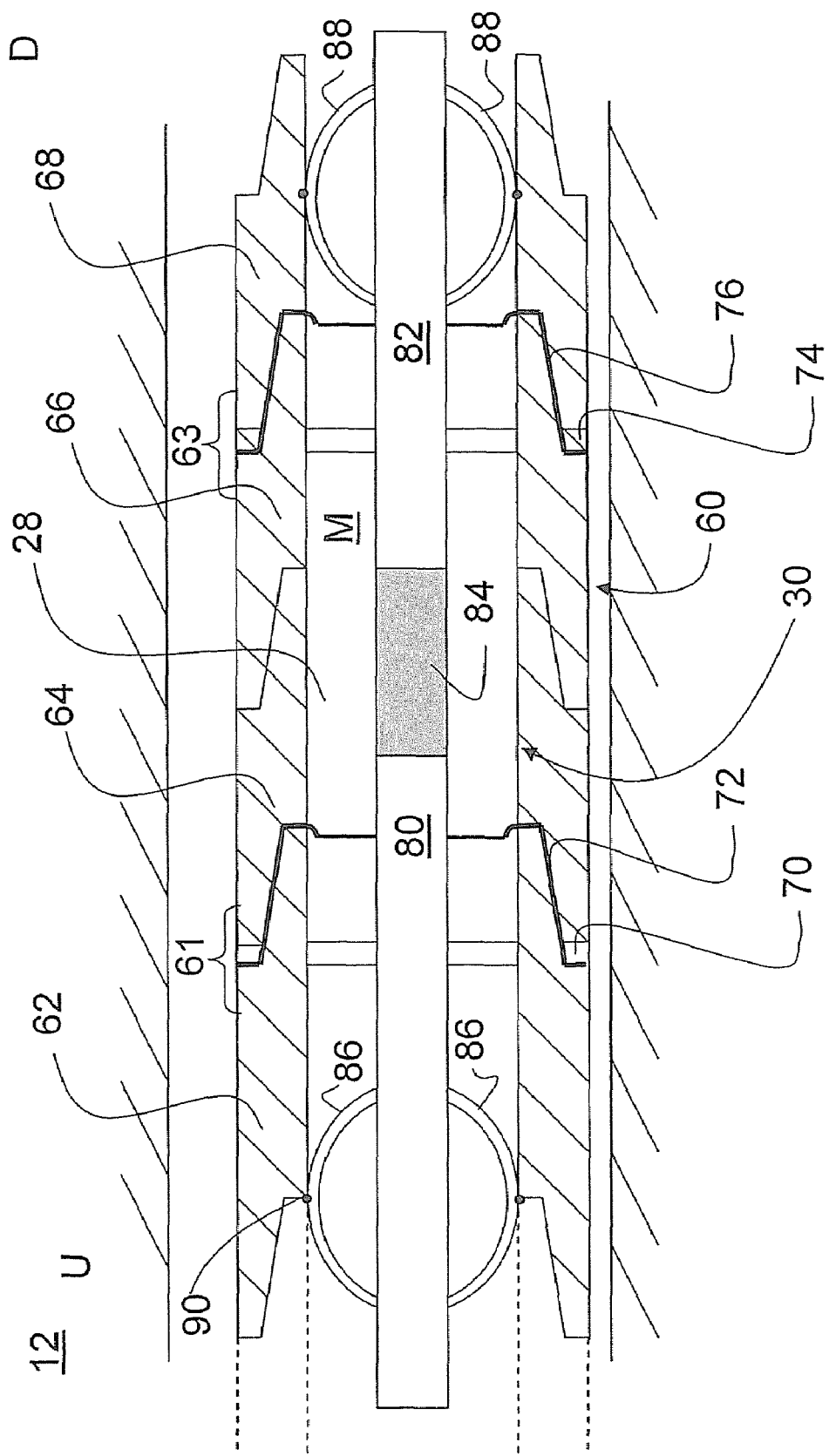
FIG. 2 is a cross-sectional view of a portion of the drill string of FIG. 1 along the line II-II.

The placement of the tool 30 within the conduit 28 of the drill string 20 is shown in FIG. 2. The tool 30 is positioned within a drill string assembly 60 comprised of a first sub-assembly 61 connected to a second sub-assembly 63. The assembly 60 is part of the lower portion of the drill string 20. The first sub-assembly 61 is comprised of a first sub 62 connected to a second sub 64. The shoulders 59 and 65 of the subs 62 and 64 respectively are separated by a non-conductive ring 70, and the threads of the subs 62 and 64 are separated by a non-conductive layer 72. Similarly, the shoulders of the subs 66 and 68 are separated by another non-conductive ring 74, and the threads of the subs 66 and 68 are separated by another non-conductive layer 76. The rings 70 and 74 are made from a suitable non-conductive material such as a ceramic. Preferably, the rings 70 and 74 are made from either Technox™ or YTZP-Hipped™, which are commercially available ceramic materials that possess beneficial characteristics such as high compressive strength and high resistivity. For example, Technox™ 3000 grade ceramic has been shown to exhibit a compressive strength of approximately 290 Kpsi and exhibit a resistivity of approximately $10^9$ Ohm·cm at 25° C.

The insulative layers 72 and 76 can, in one embodiment, be a cloth or wrapping made from a fabric such as Kevlar™, Vectran, Spectra, Dyneema, any type of Aramid fiber fabric, any type of ballistic fabric, loose weave fabrics or turtle skin weave fabrics to name a few. In general, Kevlar™ is preferable due to its favourable qualities such as high tensile strength at low weight, structural rigidity, low electrical conductivity, high chemical resistance, low thermal shrinkage, high toughness (work-to-break), dimensional stability, and high cut resistance. In general, the insulative layers 72 and 76 and the rings 70 and 74 provide electrical isolation independent of the material used to construct the subs 62, 64, 66, 68. However, preferably the subs 62, 64, 66 and 68 are made from a non-magnetic material so as to inhibit interference with the electromagnetic field F. The insulative layers 72, 76 are preferably strengthened with an epoxy type adhesive which serves to seal the sub assemblies 61, 63.

As an alternative to a wrapping or fabric, in another embodiment, the insulative layers 72, 76 comprise the application of a coating preferably a ceramic coating, to the threads to isolate the subs 62 and 64. A suitable coating is made from Aluminium Oxide or Titanium Dioxide. In addition, a coating can be applied to a pin (not shown) that locks the subs 62, 64 together to provide complete electrical isolation. It will be appreciated that any insulative coating can be applied to the threads. The threads should be manufactured to accommodate the particular coating that is used, e.g., based on the strength, hardness, etc. of the material used and the clearance needed for an adequate layer of isolation.

Figure 3:
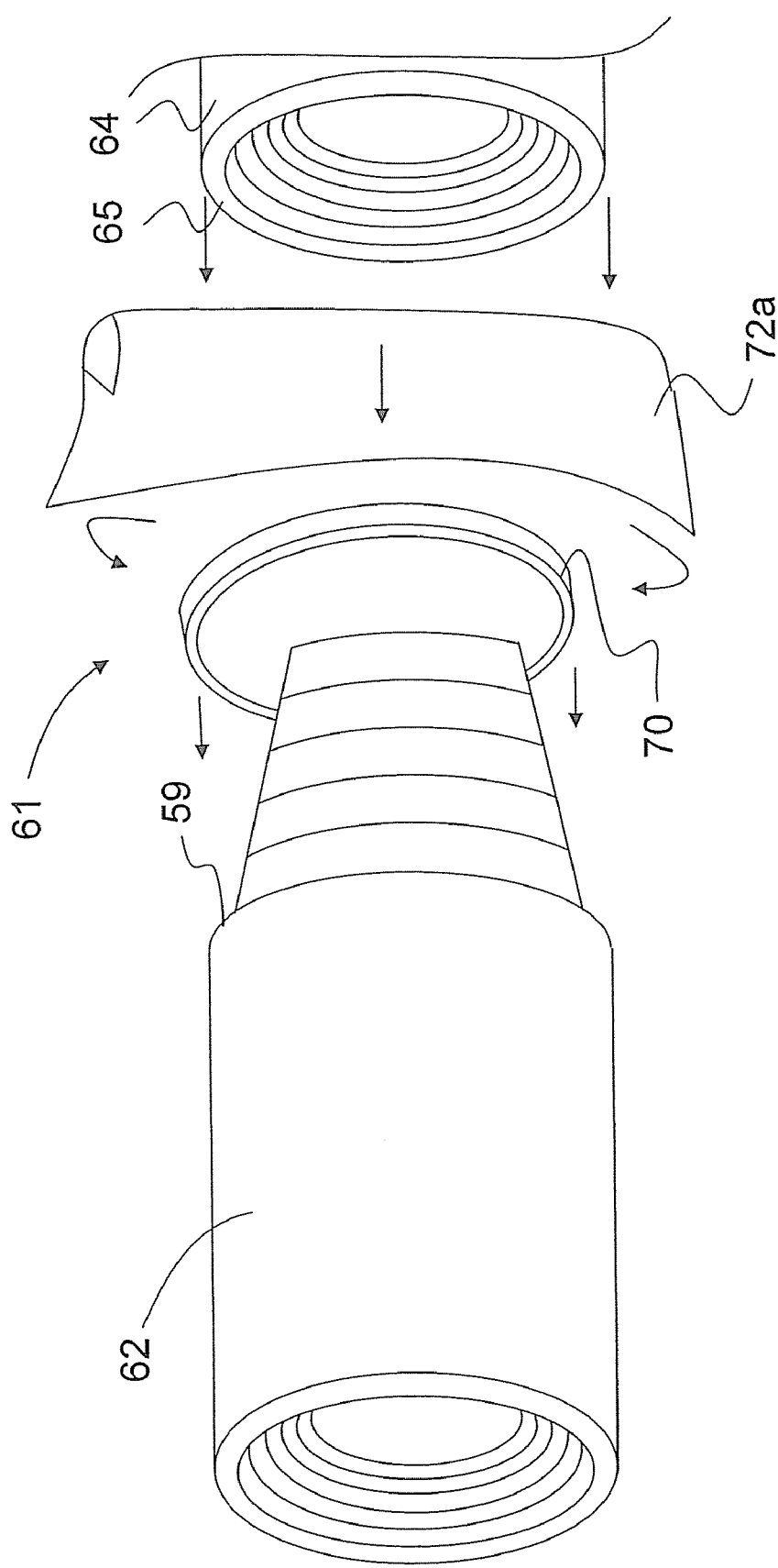
FIG. 3 is an exploded view of the first sub-assembly shown in FIG. 2.

FIG. 3 illustrates an exploded view of a preferred embodiment of the first sub-assembly 61 utilizing a wrapping of woven fabric. In a preferred assembly method, the sub-assembly 61 is assembled by sliding the ring 70 over the male-end of the first sub 62 such that it is seated on the shoulder 59. The Kevlar™ cloth 72a is then wrapped clockwise around the threads of the male-end of the sub 62, as the female-end of the second sub 64 is screwed onto the male-end of the first sub 62, until the shoulder 65 engages the ring 70. As the female-end of the second sub 64 is screwed onto the male-end of the first sub 62, the subs are preferably secured using a wax string and sealed with a suitable epoxy compound to provide a moisture barrier. In this way, the ring 70 provides electrical isolation between the shoulders 59 and 65, and the cloth 72a provides electrical isolation between the threads. As such, the sub 62 is electrically isolated from the sub 64. It will be appreciated that the second sub-assembly 63 is assembled in a similar manner. It will also be appreciated that where a coating is used to provide layers 72, 76, the coating is applied over the threads prior to screwing the subs 62, 64 together.

As shown in FIG. 2, the sub-assemblies 61 and 63 are connected together without any electrical isolation therebetween. The tool 30 includes an internal electrical isolation 84 that electrically isolates an upstream tool portion 80 from a downstream tool portion 82. Preferably, the isolation 84 is disposed between the rings 70 and 74 to distance the downstream tool portion 82 from the upstream portion U of the drill string, and to distance the upstream tool portion 80 from the downstream portion D of the drill string. The downstream portion D extends to the drill bit 18 and the upstream portion U extends and connects to the drilling equipment 22.

The upstream tool portion 80 is electrically connected to the upstream portion U of the drill string 20 at contact point 90 and the downstream tool portion 82 is electrically connected to the downstream portion D of the drill string 20 at contact point 92. In the embodiment shown in FIG. 2, the contact point 90 is provided by an interface between an upstream pair of bow-springs 86 and sub 62, and the contact point 92 is provided by an interface between a downstream pair of bow-springs 88 and sub 68. The bow-springs 86 and 88 are also used to locate and center the tool 30 within the conduit 28 by frictionally engaging the inner wall of the subs 62 and 68 respectively.

Power Supply

Figure 13:
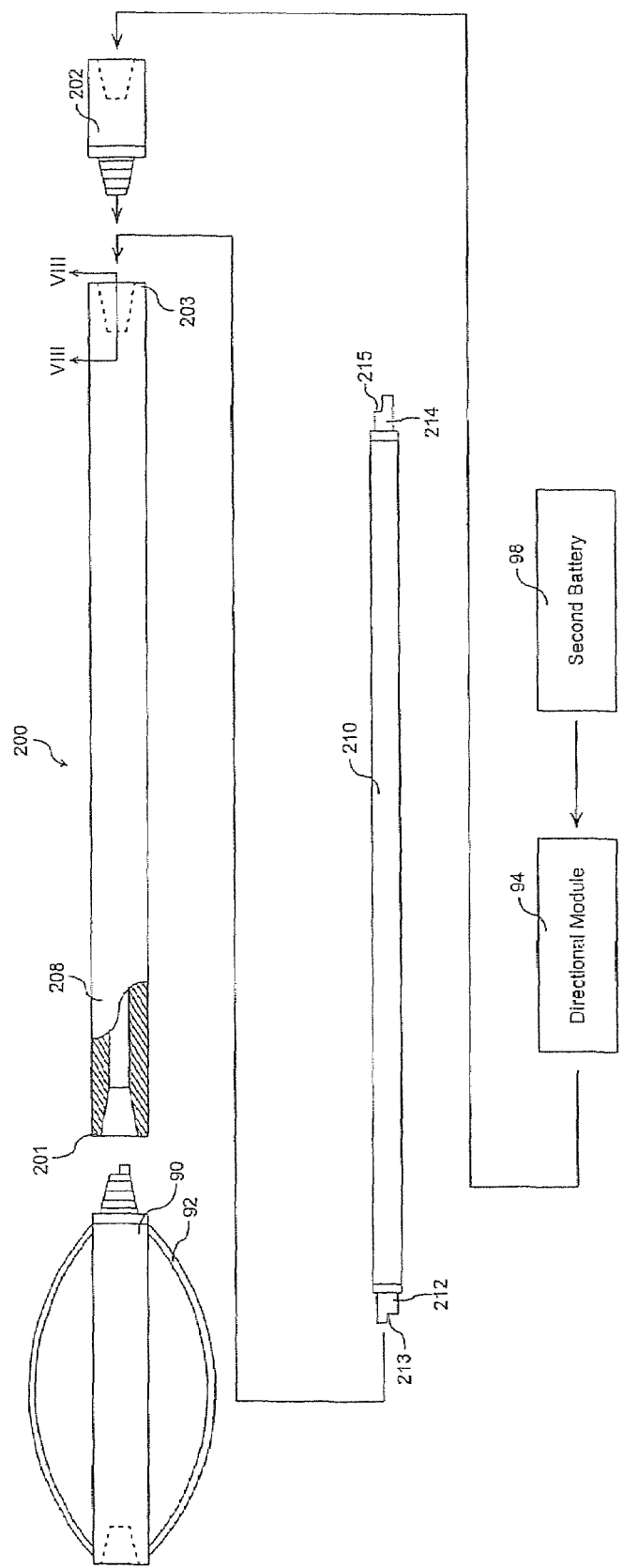
FIG. 13 is an exploded view of a power supply.
Figure 14:
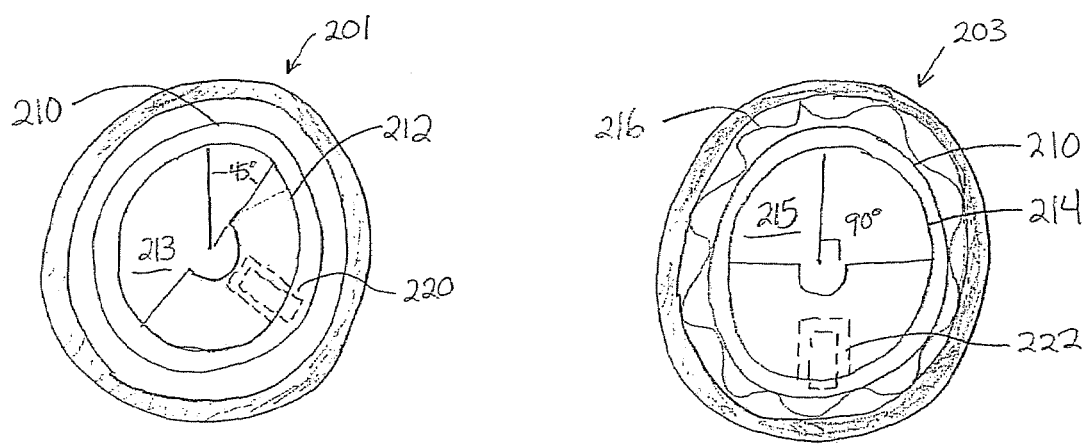
FIG. 14 is a pair of end views of the battery barrel of FIG. 13.
Figure 15:
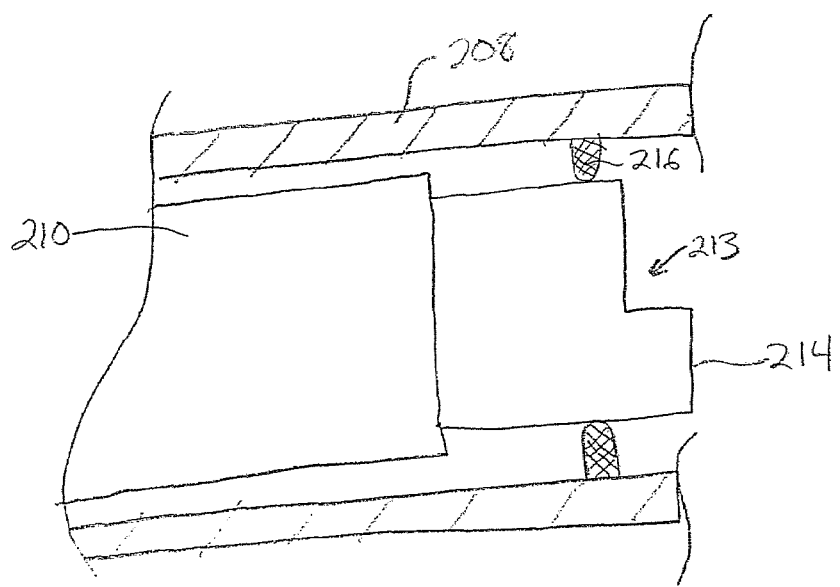
FIG. 15 is a sectional view along the line A-A shown in FIG. 13.

The EM tool 30 is powered by a power supply connected thereto. Preferably, the EM tool 30 is connected to a quick chance power supply as shown in FIGS. 13-15. Referring first to FIG. 13, an exploded view is provided showing the connections between the EM tool 30 and a power supply 200. In the example shown, the power supply 200 includes a battery barrel 208 that is connected directly to the downstream tool portion 82 at one end 201 and thus the end 201 includes a similar interconnection. A bulkhead 202 is connected to the other end 203 of the battery barrel 208 to adapt the end 203 for connection to a directional module 204. Typically, another power supply 206 is in turn connected to the direction module 204.

The battery barrel 208 houses a battery 210 The battery 210 includes a number of battery cells. It will be appreciated that the barrel 208 can be increased in length to accommodate longer batteries 210 having a greater number of cells. The battery 210 in this example includes a lower 45 degree connector 212 and an upper 90 degree connector 214. The lower connector 212 preferably includes a notch 213, which is oriented 45 degrees from the orientation of a notch 215 in the upper connector 214. The notches 213 and 215 are shown in greater detail in FIG. 14. The notches 213 and 215 are different from each other so as to be distinguishable from each other when the battery 210 is installed and thus minimize human error during assembly. As can be seen in FIG. 14, the notches 213 and 215 are generally aligned with respective retention mechanisms 220 and 222. The mechanisms 220 and 222 are preferably pin assemblies that maintain the position of the battery 210 in the barrel 208.

The upper end 214 of the battery 210 is preferably centered in the barrel 208 using a bushing 216, as shown in FIGS. 14 and 15 (wavy line in FIG. 14). The bushing 216 is arranged along the inside of the barrel 208 at end 203 and situates the upper connector 214 to inhibit movement and potential cracking of the battery casing.

The battery 210 can be changed in the field either by removing the battery barrel 208 from the EM tool 30 and the direction module 204 or, preferably, by disconnecting the module 204 from the bulkhead 202 (which disconnects the upper connector 214); disconnecting the lower connector 212 from the EM tool 30 by pulling the battery 210 from the barrel 208 and bulkhead 202; replacing the battery 210 with a new battery; and reassembling the tool 30, barrel 208 and module 204. Since the upper connector 214 and lower connector 212 are visually different, the battery 210 should assist the operator in placing the battery 210 in the barrel 208 in the correct orientation. Similarly, since, in this example, only the end 203 connects to a bulkhead 202, if the entire power supply 200 is removed, the ends 201, 203 should be obviously distinguishable to the operator.

It can therefore be seen that the battery 210 can be readily removed from the barrel 208 when a new battery is to replace it. The arrangement shown in FIGS. 13-15 thus enables a "quick change" procedure to minimize the time required to chance the battery 210, which can often be required in poor environmental conditions. It can be appreciated that minimizing downtime increases productivity, which is also desirable.

MWD Tool

Figure 4:
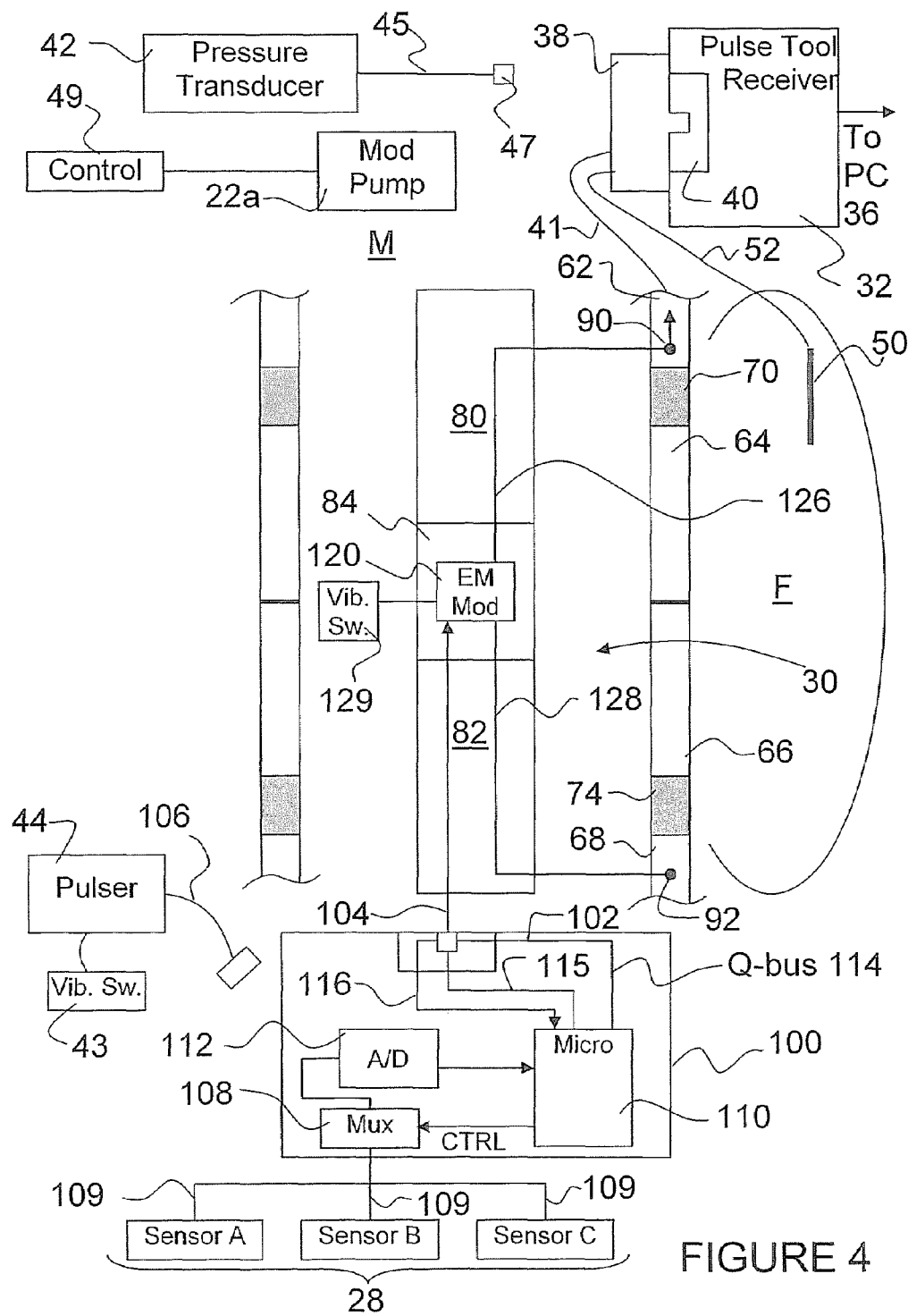
FIG. 4 is schematic block diagram of one embodiment of the EM tool and the pulse tool shown in FIG. 1.

A schematic diagram of one embodiment of the EM tool 30 is shown in FIG. 4. The EM tool 30 comprises an EM transmitter module 120 that is located within the isolation 84. In this embodiment, the transmitter module 120 operates with a conventional pulse tool 100 that normally transmits data through the mud column M using the pulser 44.

The pulse tool 100 includes a port 102 which is capable of interfacing with both the transmitter module 120 through connection 104 and the pulser 44 through connection 106 using a similar plug or connector. The pulse tool 100 also includes a multiplexer 108 ("mux") for selecting one of a series of sensor channels 109. Each sensor channel 109 transmits data that is indicative of a particular downhole parameter such as fluid pressure or fluid temperature as detected by its respective sensor 27. FIG. 4 shows three sensors, namely sensor A, sensor B and sensor C, although it will be appreciated that any number of sensors may be connected to the multiplexer 108.

The channels 109 are selected using a control signal (e.g. CTRL) output by a microprocessor 110. The microprocessor 110 includes logic for selecting a sensor 27, analyzing data from the sensor 27, and creating a signal that can be used to transmit the data to the surface. The selection of the channels 109 is made either according to a time-division scheme or alternatively another encoding and modulation scheme readily used in the art. Further detail of a suitable data transmission scheme is provided below.

The data provided by the sensors 27 is typically in the form of an analog signal, and thus the pulse tool 100 includes an analog-to-digital (A/D) converter 112 to generate a digital manifestation of the analog data before the data is input to the microprocessor 110. The microprocessor 110 prepares and transmits the data on data line 115 and generates a signal that is an echo of the signal transmitted on data line 115. This "echoed" signal is transmitted over another data line 114, often also referred to as a Q-bus 114. In general, the Q-bus 114 is a single point communication bus. In this example, all digital communications that occur are communicated along the Q-bus 114 and, new measurement data and chances in telemetry modes are echoed on the Q-bus 114 as will be explained in greater detail below.

The data lines 114 and 115 transmit data through the port 102 and over connection 104 to an EM transmitter module 120. The microprocessor 110 receives commands from the surface through yet another data line hereinafter referred to as the flow line 116. The flow line 116 is also carried by connection 104 between the pulse tool 100 and the EM module 120. The connection 104 is preferably a wire harness capable of carrying one or more separate wires. The flow line 116 originates as an output from vibration switch 129 connected to the EM module 120. The vibration switch 129 responds to vibrations in the drill string 20 generated by a mud pump included in the equipment 22. The equipment 22 is operated using an operator control 49. The vibrations generated by the mud pump 22 are indicative of a downlink control signal for changing the operating mode of the pulse tool 100 as will be explained further below.

Normally, when the pulser 44 is connected to the pulse tool 100, the data transmitted through the port 102 in the form of a voltage pulse is used by the pulser 44 to generate and transmit a sequence of pressure pulses through the mud column M. The pulser 44 generates the sequence of pressure pulses by opening and closing a restrictor valve (not shown) according to the encoding and modulation scheme generated by the microprocessor 110. The pulser 44 also includes a vibration switch 43 that responds to vibrations in the drill string 20 to change the mode of the pulse tool 100 and/or power the pulsar 44. Typically the sensitivity of the switch 43 is such that the pulser 44 will have power (i.e. be "on") when fluid is being pumped through the drill string 20. Therefore, by using the vibration switch 43, the pulser 44 is only operational while drilling occurs. When drilling stops, the vibration switch 43 will turn the pulser 44 "off".

Figure 12:
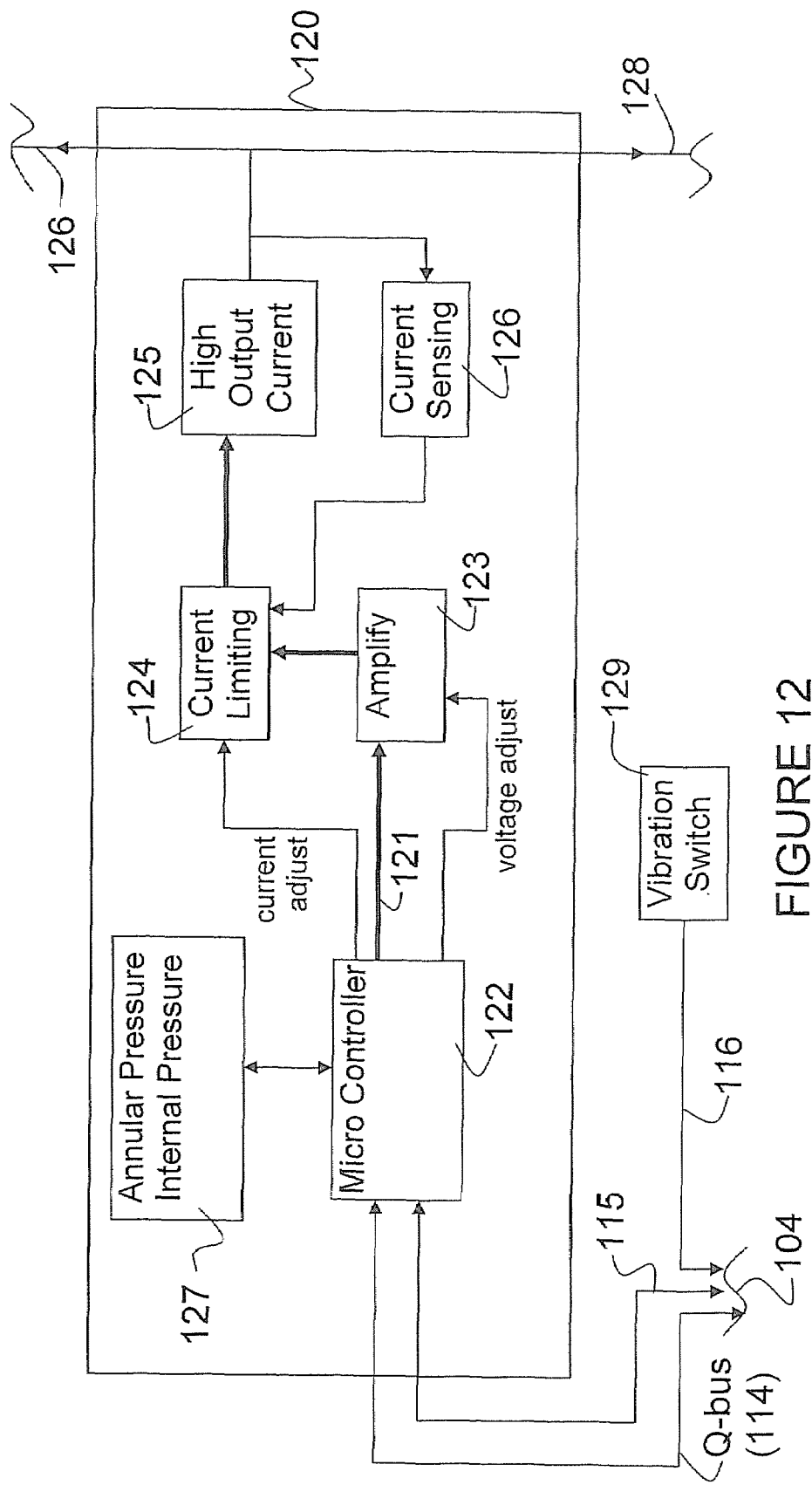
FIG. 12 is a schematic block diagram of the EM transmitter module shown in FIG. 4.

In the embodiment shown in FIG. 4, the EM tool 30 is connected to the pulse tool 100 through connection 104. The data transmitted through port 102 is carried to the EM transmitter module 120 over connection 104. The EM transmitter module 120 is shown in greater detail in FIG. 12.

The EM transmitter module 120 includes a microcontroller 122 that receives data transmitted over data lines 114 and 115 and is capable of transmitting data back to the pulse tool over data line 114. The microcontroller 122 is capable of decoding and demodulating the data transmitted by the microprocessor 110 and is capable of outputting its own encoded and re-modulated data to line 121 to be amplified by amplifier 123. The microcontroller 122 also provides an output voltage adjust signal for adjusting the amplifier 123. Preferably, a current limiting circuit 124 is used to limit the current of the signal output from the amplifier 123 to a predetermined threshold. The current limiting circuit 124 is used to balance the signal strength needed to propagate the signal to the surface through the formation, and the life of the battery. The current limiting circuit 124 limits the current draw from the battery, whereby the higher the current drawn, the shorter the battery life and the stronger the signal. Likewise, the lower the current draw, the longer the battery life but the weaker the signal strength. The microcontroller 122 also provides an output current adjust signal for adjusting the threshold of the current limiting circuit 124.

Preferably, the current-limited signal is multiplied by a gain factor using a high output current circuit 125 to produce an output EM signal of, e.g., between 1-10 Amps. In a preferred embodiment, the high output current circuit is implemented using Darlington Pairs in Parallel. As a further preference, the output EM signal also becomes part of a current sensing feedback loop 126 for adjusting the current limiting circuit 124 based on the output EM signal. A pressure sensing circuit 127 may be used to sense annular and internal pressure of the sub assembly 61. The pressure signals are transmitted to the pulse tool 100 over the Q-bus 114 to be included in the pulse line 115 transmission as will be explained in greater detail below. It will be appreciated that a suitable power supply, e.g., a battery (not shown) is used to power the above-described components of the EM transmitter module 120.

The EM signal is output on lines 126 and 128. In this embodiment, line 126 is electrically connected to sub 62 at contact point 90 and, line 128 is electrically connected to sub 68 at contact point 92. The EM signal conducts through the upstream portion U of the drill string 20 and propagates via connection 41 to the EM receiver module 38. The EM signal also propagates through the formation 16 via the electromagnetic field F and is detected by the conductive member 50 and sent over connection 52 to the EM receiver module 38.

Figure 5:
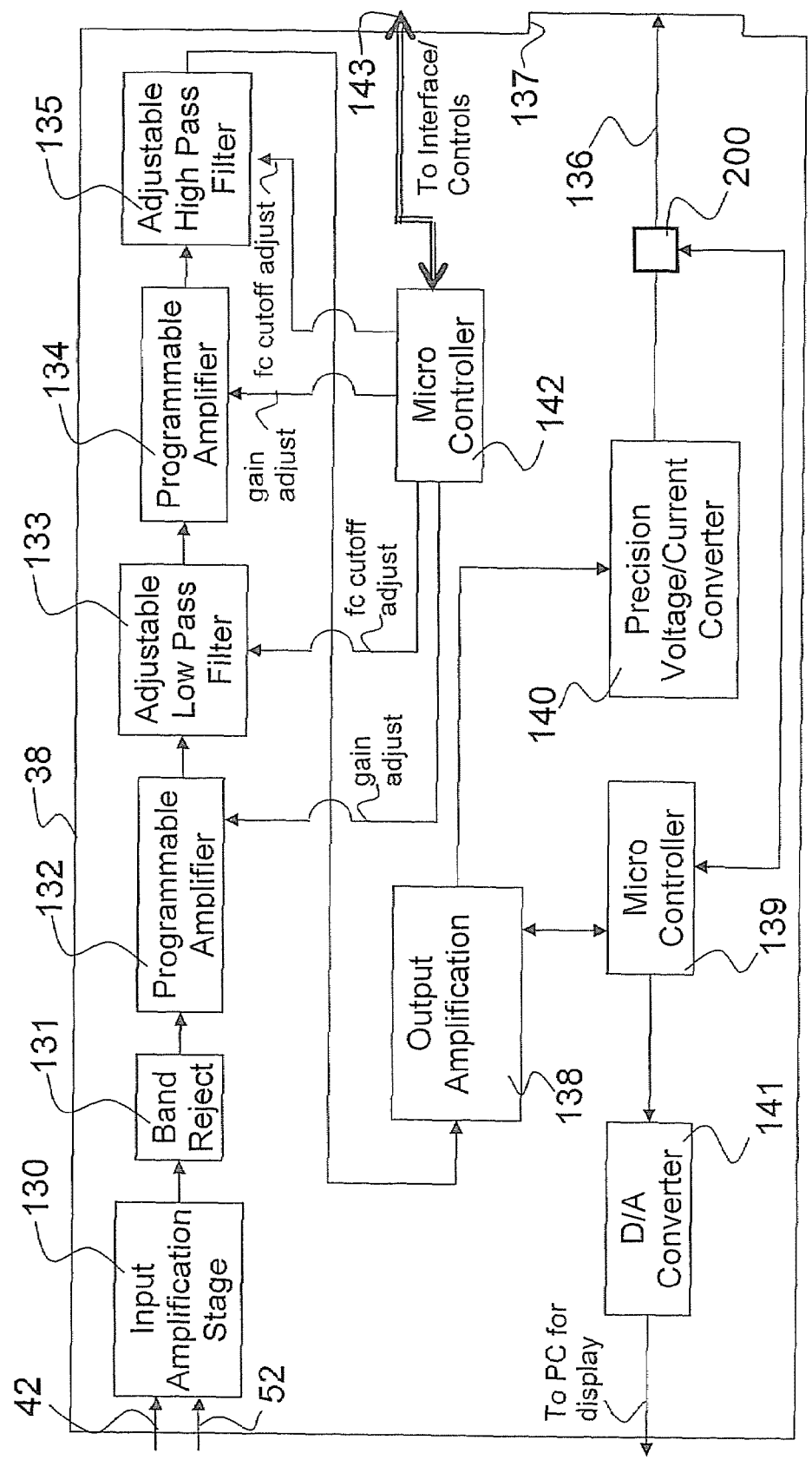
FIG. 5 is a schematic block diagram of one embodiment of the EM receiver module shown in FIG. 1.

The EM receiver module 38 for this embodiment is shown in greater detail in FIG. 5. The module 38 includes an input from each of connections 41 and 52, which are combined and amplified at an input amplification stage 130. The amplification stage 130 measures the potential difference of the two detected EM signals and outputs a combined signal. The combined signal is preferably passed through several filtering and amplification stages, e.g., a band reject stage 131, a first intermediate amplification stage 132, a low pass filter stage 113, a second intermediate amplification stage 134 and a high pass filter stage 135, An output amplification stage 138 follows stages 130-135 and the resultant signal is passed to a precision voltage/current converter to convert a voltage signal to a current output signal 136 that is fed to the pulse receiver tool 32 through connector 137. Further detail regarding the operations performed at these stages is provided below. The EM signal is amplified to accommodate for signal attenuation due to factors such as total formation resistivity, total resistivity of the pipe, resistivity of the gap sub, etc.

A microcontroller 139 may be used to monitor the output signal and operate a switch 200 to turn the signal 136 "on" or "off" in dynamic and static modes respectively. The microcontroller 139 may also be used to provide a digital output signal to a digital-to-analog (D/A) converter 141. The D/A converter 141 sends an analog output signal to a computing device and/or display (not shown) for monitoring the received EM signal. For example, a USB cable may be used to connect the receiver module 38 to the computing device.

Another microcontroller 142 is preferably included in the EM receiver module 38 for adjusting the gain of amplifiers 132, 134 and the cut off frequencies for filters 133, 135. The microcontroller 142 may be operated through a user interface or control (not shown) over connection 143. It will be appreciated that a suitable power supply, e.g., a battery (not shown) is used to power the above-described components of the EM receiver module 38.

In the embodiment of FIG. 4, the pressure transducer 42 may be interchanged with the EM receiver module 38 by replacing connector 137 with connector 47 for connecting cable 45 to the pulse tool receiver 32.

Exemplary Data Transmission Scheme

Figure 7:
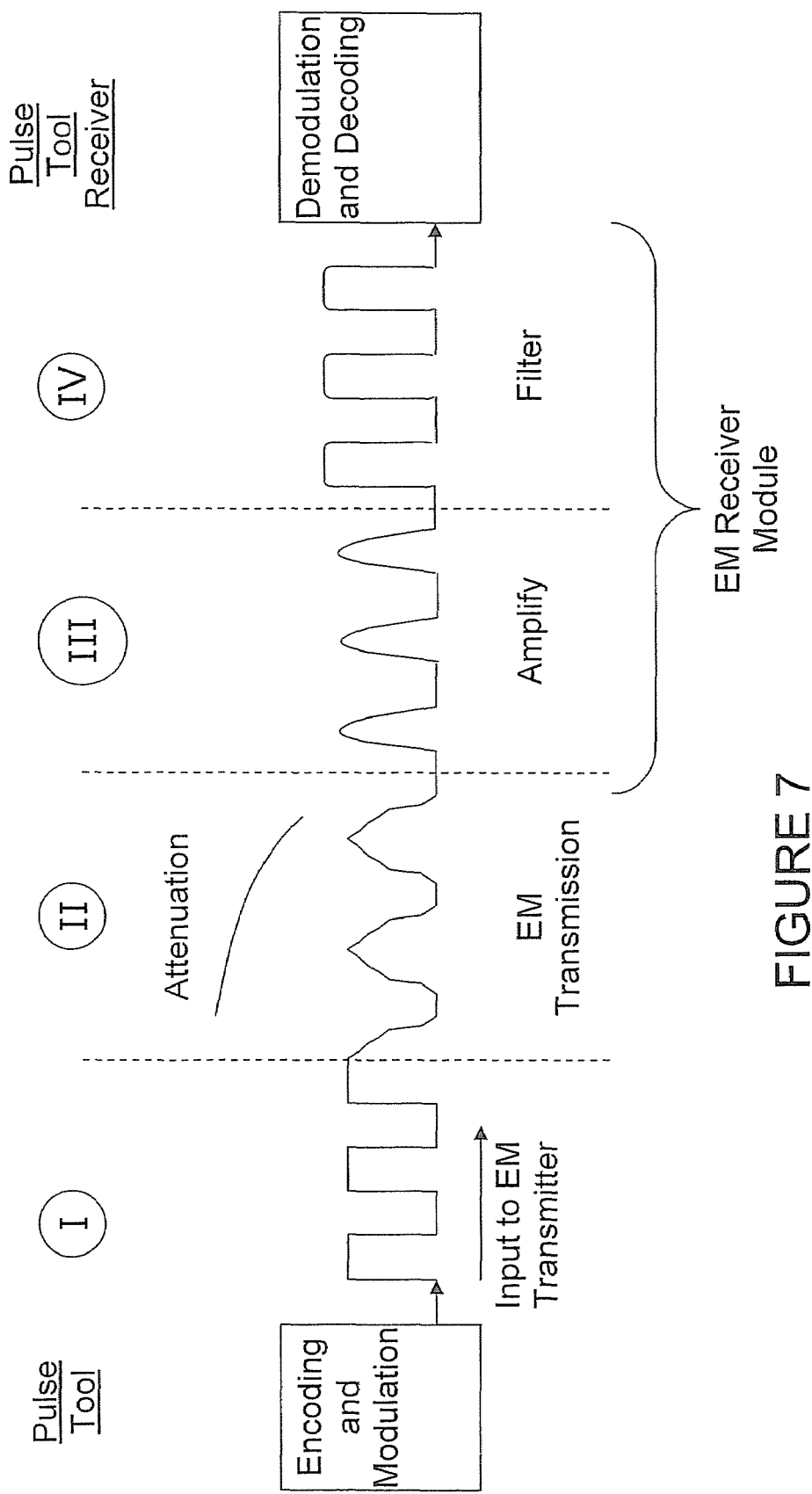
FIG. 7 is a waveform illustrating an EM data transmission.
Figure 10:
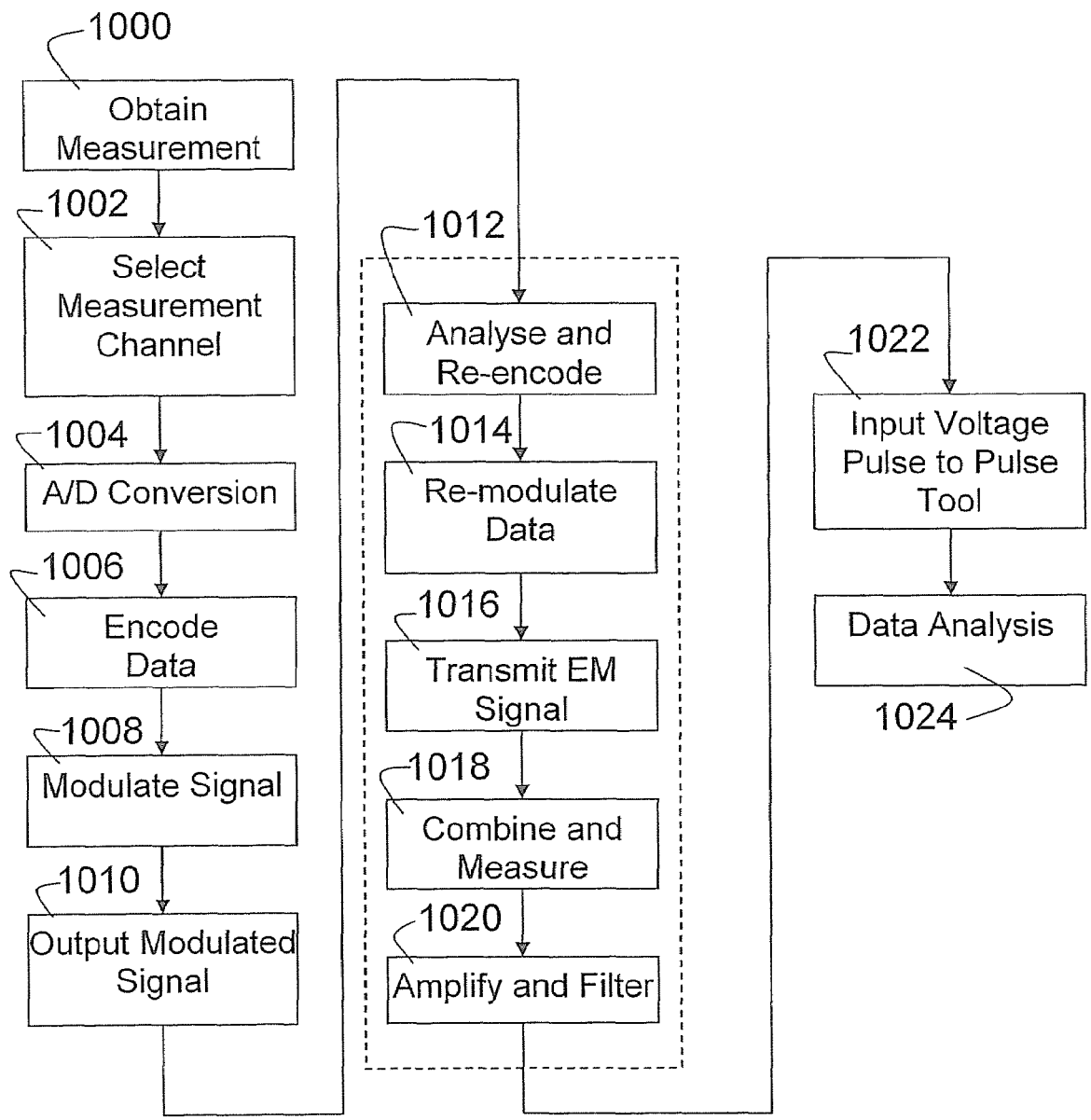
FIG. 10 is a flow diagram illustrating an EM data transmission scheme using the EM tool shown in FIG. 4.

Referring now to FIGS. 7 and 10, an example data transmission scheme for the embodiment shown in FIG. 4 will now be explained. Measurements are first obtained by one or more of the sensors 28, typically while the equipment 22 is drilling, at step 1000.

At step 1002, the microprocessor 110 generates a CTRL signal instructing the multiplexer 108 to select one of the measurement channels 109 in order to direct the data available on that particular channel to the A/D converter 12. Typically, the microprocessor 110 will operate according to pre-programmed logic that dictates which sensor 28 measurement is to be transmitted at that particular instance of time. For example, the microprocessor 110 may operate according to a time-division scheme for transmitting data from each sensor during particular time windows, according to a particular sequence, e.g., Sensor A-Sensor B-Sensor C-Sensor A-Sensor B- . . . etc.

The microprocessor 110 is capable of communicating with the surface equipment via instructions sent over the flow line 116 that have been transmitted through the mud-column M and vibration switch 129. In general, data on the flow line 116 is generated by operator-initiated mud pulses that are created using mud motor 22a. For example, pressure pulses generated by the mud motor 22a are modulated by changing the pulse width, wherein the width of the pulse is indicative of a particular mode or setting. The microprocessor 110 can then interpret the command based on the nature of the pulse signal sensed by the vibration switch 129. The pulse is typically a pulse-width-modulated (PWM) signal wherein a portion of the pulse is "on" or "high" and the remaining portion is "off" or "low". The portion which is "high" is modulated to vary the duty cycle. The duty cycle thus corresponds to a particular command.

Since the vibration switch 129 is sensitive to vibrations in the drill string 20, it can capture the PWM signal, determine the duty cycle and correlate this to a particular command, and then transmit a signal indicative of the command over flow line 116 to the microprocessor 110. The flow line 116 may therefore be used to modify the time-division scheme and/or to select a particular measurement channel 109. The flow line 116 may also be used to vary the signal strength. It will be appreciated that vibration switch 43 connected to the pulser 44 operates in a similar manner.

Once a channel 109 has been selected, the data present on that channel 109, in the form of an analog acquisition signal, is output by the multiplexer 108 and converted to a digital signal at step 1004 using the A/D converter 112. In this embodiment, the purpose of converting the measurement data to a digital signal is to transmit a digital manifestation of the measurement data to the surface as will be explained below. In the preferred embodiment, the pressure sensor 127 measures annular and internal pressure, converts the signals to digital signals using an A/D converter internal to the microcontroller 122a. The microcontroller 122a then generates an ASCII code which is sent to the microcontroller 110 in the pulse tool 100 on the Q-bus 114. The microcontroller 110 thus also incorporates the annular and internal pressure measurements into the data transmission on line 115.

Upon conversion to a digital signal at step 1004, the digital signal, represented by a binary sequence of bits (i.e. 0's or 1's), is input to the microprocessor 110 for encoding at step 1006. Generally, encoding transforms the original digital data signal into a new sequence of coded symbols. Encoding introduces a structured dependency among the coded symbols with the aim to significantly improve the communication performance compared to transmitting uncoded data. In the preferred embodiment, M-ary encoding is used, where M represents the number of symbol alternatives used in the particular encoding scheme.

The encoded data is then modulated at step 1008. In general terms, modulation is a step of signal selection which converts the data from a sequence of coded symbols (from encoding) to a sequence of transmitted signal alternatives. In each time interval, a particular signal alternative is sent that corresponds to a particular portion of the data sequence. For example, in a binary transmission, where two different symbols are used, the symbol representing a "high" or "1", will be sent for every "1" in the sequence of binary data. In the result, a waveform is created that carries the original analog data in a binary waveform. Where M is greater than 2, the number of symbol alternatives will be greater and the modulated signal will therefore be able to represent a greater amount data in a similar transmission.

In the preferred embodiment, an M-ary encoding scheme is used which involves breaking up any data word into combinations of two (2) and three (3) bit symbols, each encoded by locating a single pulse in one-of-four or one-of-eight possible time slots. For example, a value 221 encodes in M-ary as 3, 3, 5. The 3, 3, 5 sequence comes from the binary representation of 221, which is 11|011|101. In this way, the first 3 comes from the 2-bit symbol 11, the second 3 comes from the 3-bit symbol 011, and the 5 comes from the 3-bit symbol 101.

At step 1010, the microprocessor 110 outputs a modulated signal, which is typically a modulated voltage pulse. The modulated signal is intended for use by the pulser 44 to generate a sequence of pressure pulses according to the modulated signal. However, in the embodiment shown in FIG. 4, the EM transmitter module 120 is connected to the port 102 and will therefore intercept the modulated voltage signal and re-encode the data at step 1012. In FIG. 10, the steps related to EM data transmission are grouped by a dashed box.

At step 1012, the microcontroller 122 intercepts the modulated signal output by the pulse tool 100. As illustrated in FIG. 7, the pulse tool 100 typically produces a square-wave voltage pulse in stage I of the waveform shown. It will be appreciated that the waveforms shown in FIG. 7 are for illustrative purposes only. The microcontroller 122 then decodes and if necessary re-encodes the signal for re-modulation at step 1014 to produce an output EM signal 121. The EM transmission is shown in FIG. 7 in stage II of the waveform.

The output 121 is amplified at stage 123. An amplified signal is then input to the current limiting stage 124 to produce a current limited signal. The current limited signal is then input to the high output current stage 125 to produce an output of between 1-10 Amps. The resultant output EM signal is transmitted over both line 126 and line 128. The output is also fed back through the current sensing stage 126 which monitors the output EM signal and adjusts the current limiting stage 124 to control and limit the amount of current being produced by the high output current stage 125.

As noted above, an EM signal transmission will propagate through the upstream portion U of the drill string 20 and then over connection 41 to the EM receiver module 38. The EM signal that is transmitted on line 128 will make contact with the downstream portion D of the drill string 20 at contact point 92. The voltage applied between the upstream U and downstream D portions at contact points 90 and 92 respectively will create positive and negative dipoles and in the result, generate the electric field F. The field F will carry another EM transmission through the formation 12 and will be conducted through connection 52 due to the presence of the conducting member 50. Both EM signal transmissions are input to the EM receiver module 38 and are combined and measured at step 1018, and amplified and filtered at step 1020.

Figure 6:
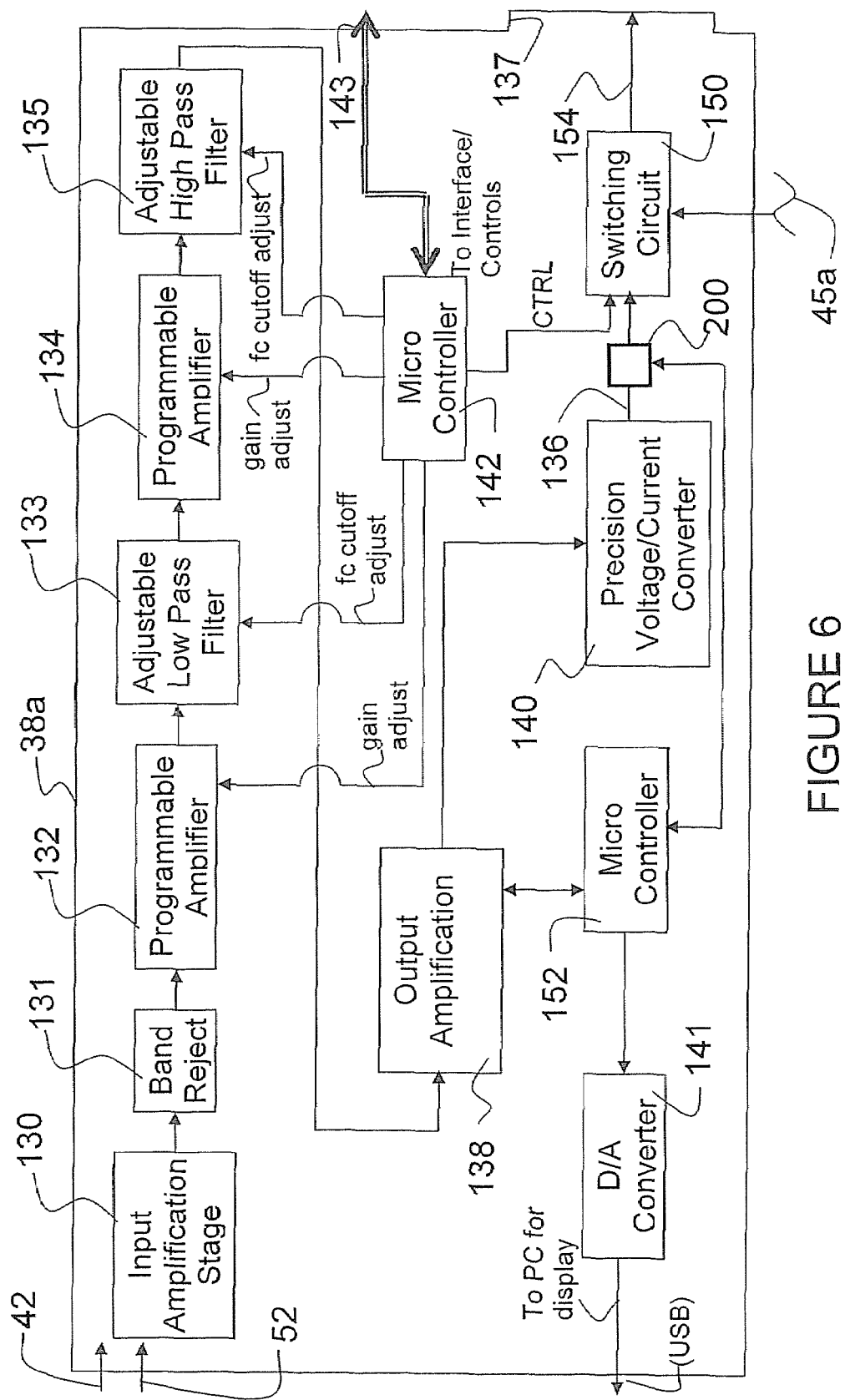
FIG. 6 is a schematic block diagram of another embodiment of the EM receiver module shown in FIG. 1.

In particular, the potential difference between the two EM signals is measured and amplified at stage 130 and the resultant EM signal is input to the band reject stage 131 in order to reject signal elements that are of a particular frequency, e.g. 60 Hz as shown in FIG. 5. The output from the band reject stage 131 is input to the first intermediate amplification stage 132 to amplify the filtered signal. The amplified signal then undergoes low pass filtering at stage 133 to filter out high frequency components of the EM signal. The resultant filtered EM signal is again amplified at the second intermediate amplification stage 134 and then undergoes high pass filtering at stage 135 to filter out low frequency components of the signal. The choice of how many and what types of filtering and amplification operations is dependent on the application and, it will be appreciated that the stages shown in FIGS. 5 and 6 are for illustrative purposes only.

The microcontroller 142 is used to adjust the cut off frequencies of the low and high pass filters 133, 135 and to adjust the gain of the amplifiers 132, 134. As discussed above, the microcontroller 142 is controlled through a connection 143 to an interface or control module (not shown) which is accessible to the driller. The cut off frequencies and gain settings can be adjusted at any time, but preferably are adjusted during a period of down time so as to maintain a consistent transmission.

A final amplification of the EM signal is performed at the output amplification stage 138. The amplified output EM signal is then converted from a voltage signal to a current signal using the precision voltage/current converter 140. The microcontroller 139 monitors the output amplification stage 138 and provides a digital signal to the D/A converter 141. The D/A converter 141 then converts the signal to an analog output for display.

The microcontroller 139 is preferably capable of interrupting the output signal 136 by turning switch 200 "on" and "off" for signalling a switch between the dynamic (drilling) mode and the static (survey) mode. In dynamic mode, only dynamic data needs to be communicated to the surface, whereas in static mode, only static data needs to be transmitted to the receiver tool 32. As such, communicating static data while in dynamic mode and vice versa is typically an inefficient use of time and bandwidth resources. To switch between dynamic and static modes, the vibration switch, e.g. switch 129, is turned "on" for dynamic mode and "off" for static mode. Likewise, at the surface, the mud pump 22a pressure and transducer 42 are "on" for dynamic mode and "off" for static mode. The switch 200 is thus used to signal to the software in the receiver tool 32 when a switch occurs between dynamic and static modes. For EM transmission as shown in FIG. 4, a signal is input directly to the port 40. Therefore, the microcontroller 139 monitors the signal and/or lack thereof and, based on such monitoring can determine when to switch from static mode to dynamic mode and vice versa. This signals to the software whether the pumps are "on" or "off".

The output signal 136 is input to the pulse receiver tool 32 through connection 137 where normal processing and monitoring occurs.

As illustrated in stage 11 of the waveform shown in FIG. 7, the EM signal, as it propagates to the surface, will typically experience certain losses which result in attenuation of the signal by the time it reaches the EM receiver module 38. Referring also to FIG. 5, a conditioned output 136 is provided to connector 137 for and input to the pulse tool at step 1022. The conditioned output 136 is an amplified and filtered version of the signal sent to the surface. Such amplification and filtering is exemplified in FIG. 7 in stages III and IV respectively of the illustrated waveform.

The conditioned output 136 is intended to be substantially similar to the square waveform (not shown) that would have been input to the pulse tool receiver 32, had the pulser 44 been used instead of the EM tool 30. Therefore, the EM tool 30 in FIG. 4 is adapted to mimic a mud-pulse and, as such, the signal input to the pulse tool receiver 32 at step 1022 appears to be a mud-pulse signal whether or not it actually is. In the result, significant modifications to the software or hardware in the pulse tool receiver 32 do not need to be made in order to transmit data acquired by the pulse tool 100, using EM telemetry. Similarly, data analysis performed at step 1024 may occur as usual whether mud-pulse telemetry or EM telemetry is used.

In operation, an existing pulse tool such as pulse tool 100 may used to operate an adapted EM tool 30 to benefit from the faster data transmission of EM telemetry without requiring substantive modifications to its configuration. For example, the connections 102 and 104 may be interchanged to switch between use of the pulser 44 and use of the EM tool 30. Therefore, the EM tool 30 may be used for normal operating conditions and, if drilling is to be done in geologic formations such as salt domes where EM transmissions may be lost, the EM tool 30 may be exchanged with the pulser 44 by removing connection 104 from port 102 and connecting the line 106.

In the embodiment shown in FIG. 4, the EM receiver module 38 is also swapped with the connector 47 to change between EM telemetry and mud-pulse telemetry Therefore, once the pulser 44 has been connected and drilling commences, in order to obtain the data transmitted by the pulser 44, the pressure transducer 42 is plugged into port 40. In using either EM or mud-pulse telemetry, the pulse tool 100 and the pulse tool receiver 32 do not distinguish between the particular telemetry and will operate as if the pulser 44 was always plugged into port 102.

The EM tool 30 enables a driller to upgrade or add EM capabilities to existing mud-pulse My capabilities. When switching between telemetry modes, only the transmission tool (e.g. tool 30 or pulser 44) needs to be removed along with a connector at the receiver 32. Therefore, if the pulse tool 100 is itself further down the drill string 20 than is the pulser 44 or EM tool 30, removal is inherently easier. Moreover, switching between telemetry modes at the surface can be effected offsite by simply swapping connectors at the port 40. Therefore, there is no need to access the rig 10 or drilling equipment 22 in order to make the switch and, the pressure transducer 42 can remain installed in the rig whether EM or mud-pulse telemetry is used.

In the embodiment shown in FIG. 4, in order to switch between mud-pulse telemetry and EM telemetry, the drill string 20 is tripped. When the switch is made between jobs, i.e. when the string 20 is to be tripped anyhow, the driller will not likely be unduly inconvenienced. However, if a switch between telemetry schemes is desired during a drilling job, the time and labor involved in tripping the drill string 20 may be prohibitive.

Alternative Embodiment

Figure 8:
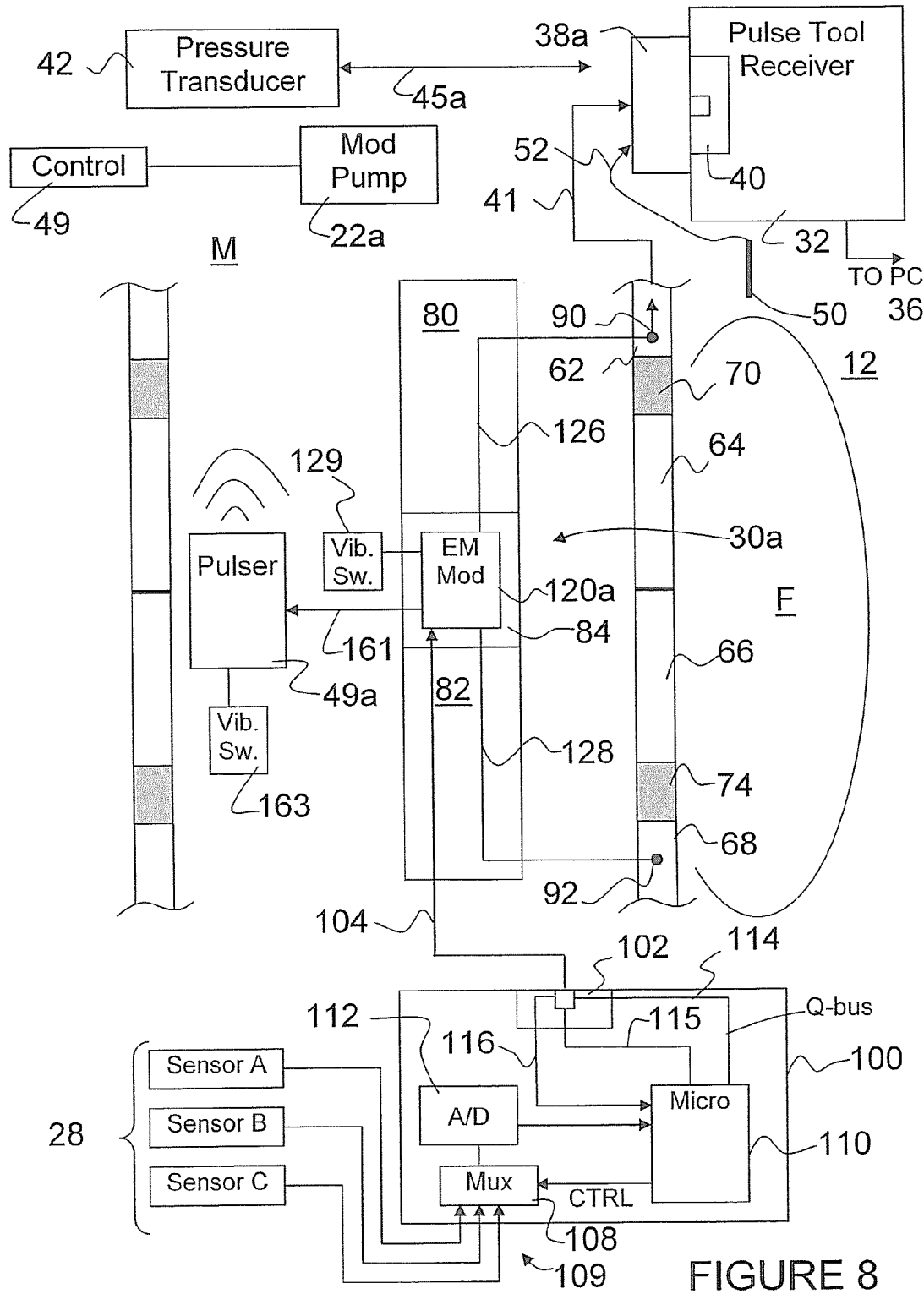
FIG. 8 is a schematic block diagram of another embodiment of the EM tool and the pulse tool shown in FIG. 1.

In another embodiment, shown in FIG. 8, the EM tool 30 is adapted to offer dual telemetry capabilities, in particular, to accommodate both an EM telemetry mode and mud-pulse telemetry mode without tripping. In FIG. 8, like elements are given like numerals with the suffix "a", and identical elements are given identical numerals for clarity. The adapted EM tool 30a is connected to the conventional pulse tool 100 in a manner similar to that described above, namely through port 102. An adapted pulser 44a is connected to the pulse tool 100 at an adapted EM transmission module 120a through signal line 161. At the surface, an adapted EM receiver module 38a includes a connection to lines 42 and 52 as before, but also includes a connection 45a to the pressure transducer 42. The adapted module 38a is connected to the pulse receiver tool 32 in a manner similar to that described above, namely through port 40. Further detail regarding the adapted EM receiver module 38a is provided below. The pulser 44a includes a vibration switch 163, which operates in a manner similar to switch 129 and switch 43 described above.

Figure 9:
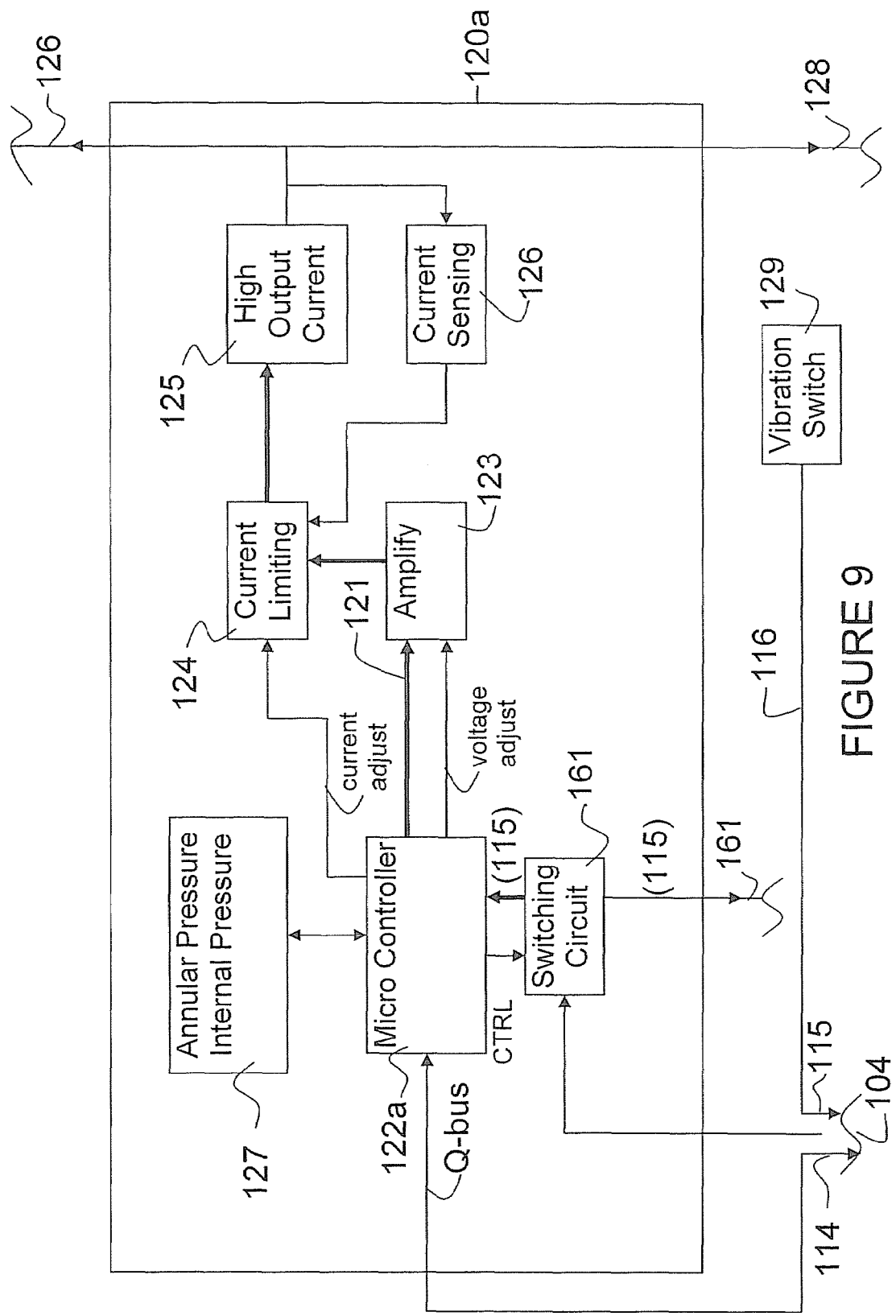
FIG. 9 is a schematic block diagram of the EM transmitter module shown in FIG. 8.

The adapted EM transmission module 120a is shown in greater detail in FIG. 9. The module 120a includes a switching circuit 160, e.g. a multiplexer, for directing data on lines 114 and 115 to either the microcontroller 122a that is internal to the module 120a or to the adapted pulser 44a over connection 161. It will be appreciated that redirection of the data present on lines 114 and 115 may also be effected using a relay or other suitable circuitry. The microcontroller 122a monitors the data provided on Q-bus data line 114 to determine which mode of telemetry should be in use. Detail regarding, the data transmitted by the Q-bus data line 114 is explained in greater detail below.

Based on the data input to the microcontroller 122a on the data line 114, the microcontroller 122a outputs a control signal (e.g. CTRL) to the multiplexer 160 for directing the signal present on line 115. The microcontroller 122a, when operating in an EM telemetry mode, will perform similar decoding, re-encoding and re-modulation as explained above. Similarly, the EM modulator 124 operates to mimic a mud-pulse signal as explained above. Accordingly, the multiplexer 160 and additional logic programmed into the microcontroller 122a enables the EM transmitter module 120a to redirect the data measured by the sensors 28 in order to also use mud-pulse telemetry when desired.

The adapted receiver module 38a is shown in greater detail in FIG. 6. As explained above, the signals 42 and 52 are combined at stage 130, and conditioned as explained above to provide a conditioned output signal 136. In the adapted receiver module 38a, a switching circuit 150 (e.g. multiplexer) is used to select either output signal 136 Generated for an EM transmission or an output 45a from the pressure transducer 42, which is connected directly to the module 38a in this embodiment. Preferably, the microcontroller 142 includes logic or can be instructed to switch between the two telemetry modes using a CTRL signal. An output 154 provided by the multiplexer 150 is input to the port 40 similar to output I 36 in the embodiment shown in FIG. 4.

Figure 11:
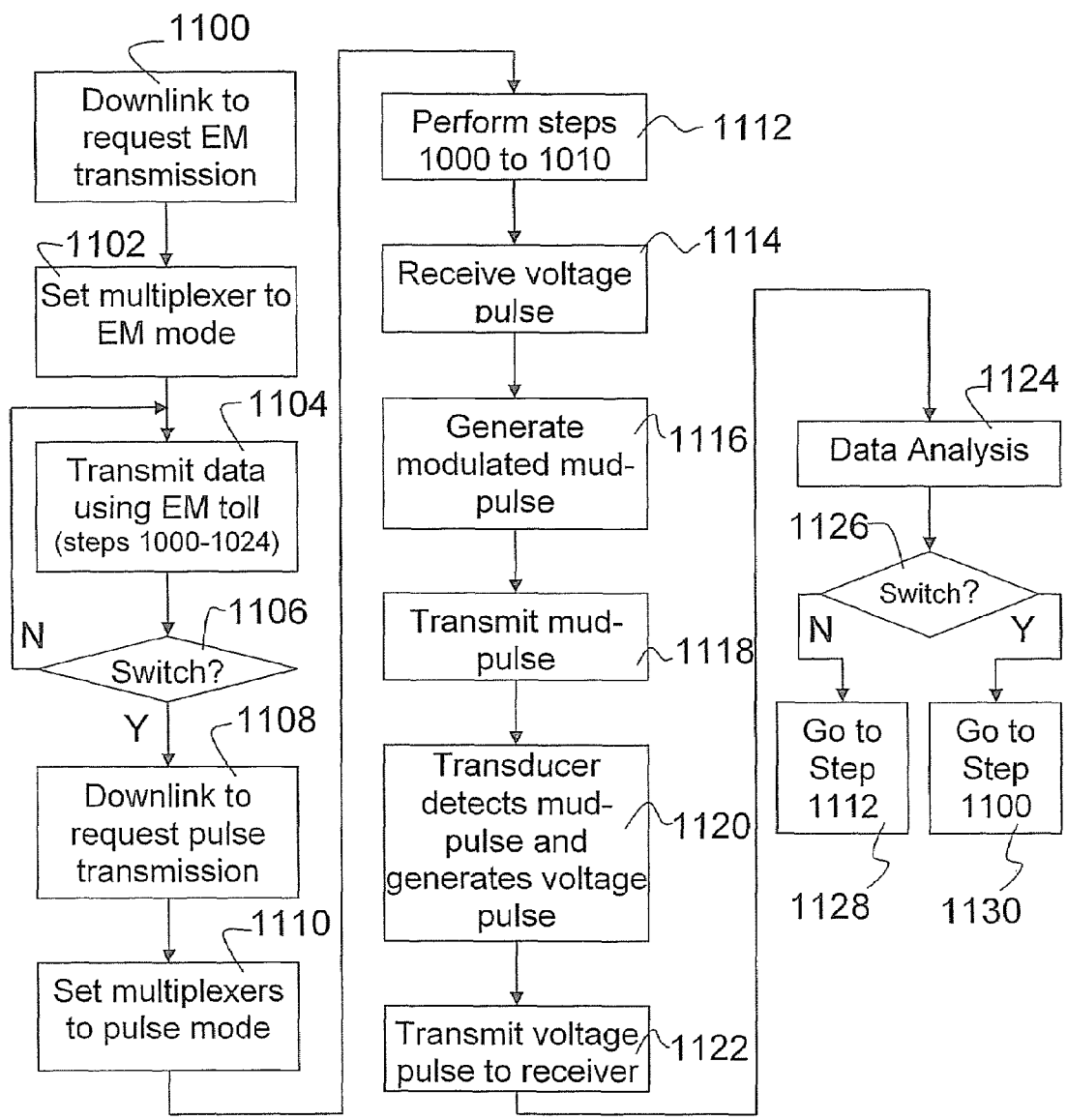
FIG. 11 is a flow diagram illustrating the steps in a transmission of data using both EM telemetry and mud-pulse telemetry modes using the EM tool and pulser shown in FIG. 8.

A data transmission scheme illustrating a data transmission including a swap between an EM telemetry mode and a mud-pulse telemetry mode is shown in FIG. 11. For illustrative purposes only, the scheme shown in FIG. 11 operates first in the EM telemetry mode and then switches to the mud-pulse telemetry mode.

At step 1100 the control 49 is used to send an instruction to the pulse tool 100 requesting the EM telemetry mode by selectively turning the mud motor 22a "on" and "off" according to a particular duty cycle. In the preferred embodiment, four modes are utilized, wherein mode 1 corresponds to EM telemetry at a first voltage and current setting, mode 2 corresponds to EM telemetry at a second voltage and current setting, mode 3 corresponds to mud-pulse telemetry at a first mud-pulse width, and mode 4 corresponds to mud-pulse telemetry at a second mud-pulse width. The mud motor 22a is used to generate a pressure pulse sequence indicating one of the four mode signals which propagates through the mud column M. The vibration switches 129 and 163 react to the downlink pulse train to generate a flow line signal which is sent over the flow line 116 to the microprocessor 110.

The microprocessor 110 interprets the flow line to determine the requested mode and generates a code that indicates which mode is being requested (e.g. mod1, mod2 etc.). The code is transmitted on the Q-bus line 114 to microcontroller 122a. In the present example, EM telemetry is requested and thus one of mode 1 and mode 2 is indicated in the code. The microcontroller 122a determines that the EM telemetry mode is being requested and sends a CTRL signal to the multiplexer 160 at step 1102 for directing the signal present on line 115 to itself for encoding and modulation in the EM mode.

At the same time, the microcontroller 142 is instructed to direct the data input on line 136 from the EM receiver module 38a to the receiver tool 32 using the CTRL signal. Preferably, the microcontroller 142 is instructed by a command or control sent over connection 143 to an external interface (not shown).

At step 1104, the EM tool 30 will then operate as described above with respect to steps 1000-1024 shown in FIG. 10. However, preferably, the pressure sensor 127 measures annular and internal pressure, converts the signals to digital signals using an A/D converter internal to the microcontroller 122a. The microcontroller 122a then generates an ASCII code which is sent to the microcontroller 110 in the pulse tool 100 on the Q-bus 114. The microcontroller 110 thus also incorporates the annular and internal pressure measurements into the data transmission on line 115 in the preferred embodiment.

The transmission of measured data using EM telemetry continues until it is determined by the driller or internal logic included in the controller 49 at step 1106 that the mud-pulse telemetry mode is desired. For example, if the EM signal is lost due to the nature of the formation 12 being traversed at that time, the EM receiver module 38a may then use the mud motor 22a to send an instruction to the pulse tool 100 requesting the mud-pulse telemetry mode at step 1108 (e.g. mode 3 or mode 4). The microcontroller 152 preferably includes logic for detecting a lost EM signal. Such detection may include a simple detection that the waveform exists, taking noise into account.

It will be appreciated that any suitable down link transmission may be used to communicate from the surface to the pulse tool 100. For example, an EM downlink signal may be used to provide downlink communications rather than a mud-pulse downlink signal.

In one scenario, a receiver circuit (not shown) is incorporated into the EM transmitter module 120, 120a that is capable of receiving an EM transmission from a downlink EM transmitter (not shown) having similar circuitry included in the EM receiver module 38, 38a. In this scenario, the EM transmitter module 120, 120a and the EM receiver module 38, 38a are time synchronized. The EM transmitter 120, 120a first sends a data string to the surface receiver module 38, 38a to initiate the downlink and then listens while the surface receiver 38, 38a sends an EM transmission downhole. It will be appreciated that in this scenario, the EM transmission module 120, 120a preferably interprets the downlink EM signal and sends a signal on flow line 116 as before for generating and sending a code on the Q-bus 114.

In another scenario, the EM receiver included in the EM transmitter module 120, 120a further includes a band pass filter with a pass band that is different than the transmission frequency used by the EM transmitter module 120, 120a. The pass band is also different than the surface transmitter frequency. In this scenario, downlink EM transmissions can occur at the same time as the normal EM data transmissions without interfering, and does not require time synchronization.

At step 1110 the microcontroller 110 generates a new code on the Q-bus indicating the mode 3 or mode 4 has been requested. The microcontroller 122a at the EM module 120a then interprets the code and alters the CTRL signal to switch the data line 115 to transmit directly to the pulser 44 over line 161. Also at step 1110, the multiplexer 142 is set to transmit data from the pressure transducer 42 through connection 45a at the EM receiver module 38a. Again, the microcontroller 142 is preferably instructed by a command received at an external interface over connection 143.

At step 1112 the pulse tool 100 operates according to steps 1000 to 1010 as described above. The resultant voltage pulse generated by the pulse tool 100 is then received by the adapted pulser 44a at step 114. The pulser 44a then modulates and transmits a sequence of pressure pulses to carry the data through the mud-column at step 1118. The pressure transducer 42 detects the pressure pulses at step 1120 and generates a voltage pulse at step 1122 to transmit to the pulse tool receiver 32 through connection 45a. Since the multiplexer 142 has already been set to accept data from the pressure transducer 42, the data analysis at step 1124 is performed based on the data transmitted according to mud-pulse telemetry. Again, the pulse tool receiver 32 will not be able to distinguish been the modes and thus does not need any software or hardware modifications in order to do so.

The receiver module 38a will preferably contain logic for determining if the current telemetry mode, in this example mud-pulse telemetry, should continue at step 1126. If there is to be no chance in which telemetry mode is used then at step 1128 the above procedure repeats beginning at step 1112. If a change in telemetry modes is desired or required, then at step 1130 the procedure above continues beginning at step 1100.

Therefore, the use of dual telemetry may be accomplished by adapting an EM tool 30a, pulser 44a, and receiver module 38a in order to work with an existing pulse tool 100 and pulse tool receiver 32. An EM transmission may be used that mimics a mud-pulse transmission. In the result, modifications to the pulse tool 100 and pulse tool receiver 32 are not required in order to provide an additional EM telemetry mode while taking advantage of an existing mud-pulse telemetry tool 100. Moreover, the drill string 20 does not require tripping to switch between mud-pulse telemetry and EM telemetry.

Although the invention has been described with reference to certain specific embodiments, various modifications thereof will be apparent to those skilled in the art without departing from the spirit and scope of the invention as outlined in the claims appended hereto.

What is claimed is:

1. A method for transmitting data in a wellbore to a surface receiver, said wellbore having a drill string, said method comprising the steps of:

providing an interface between an electromagnetic (EM) transmitter and a mud pulse tool;

said EM transmitter intercepting a data signal normally provided by said mud pulse tool to a mud pulser via said interface, said data signal being indicative of at least one parameter acquired by said mud pulse tool from at least one sensor;

said EM transmitter generating an EM signal according to information provided by said data signal, said EM signal being modulated to provide a substantially square waveform to mimic a mud pulse signal; and said EM transmitter transmitting said EM signal to said surface receiver.

2. The method according to claim 1 wherein said surface receiver includes an EM receiver module for receiving said EM signal and a mud pulse receiver module connected to said EM receiver module, said method further comprises: receiving said EM signal at said EM receiver module; said EM receiver module conditioning said EM signal; and said EM receiver module inputting said conditioned signal to said mud pulse receiver module; wherein said mud pulse receiver module operates according to mud-pulse telemetry.

3. The method according to claim 1 wherein generating said EM signal comprises decoding said data signal and modulating a decoded signal to produce said EM signal.

4. The method according to claim 3 wherein said data signal is M-ary encoded.

5. The method according to claim 1 comprising controlling transmission of said EM signal downhole by downlinking to an EM transmitter module.

6. The method according to claim 1 comprising utilizing a current sensing module to apply current limiting to conserve power.

7. The method according to claim 1 comprising the step of, upon receiving said EM signal, performing one or more filtering stages and one or more amplification stages to produce a conditioned signal for said surface receiver.

8. The method according to claim 1 comprising the step of using a vibration switch to switch between a static mode for surveying operations and a dynamic mode for drilling operations.

9. A method for transmitting data in a wellbore to a surface receiver, said wellbore having a drill string, said method comprising the steps of:

providing an interface between an EM tool and a mud pulse tool said EM tool intercepting a data signal normally provided by said mud pulse tool to a mud pulser via said interface, said data signal being indicative of at least one parameter acquired by said mud pulse tool from at least one sensor;

generating an EM signal using said EM tool according to information provided by said data signal, said EM signal being modulated to provide a substantially square waveform to mimic a mud pulse signal;

transmitting said EM signal to said surface receiver;

instructing said EM tool to operate in a mud-pulse telemetry mode;

redirecting said data signal to said mud-pulser;

generating a sequence of pressure pulses using said mud-pulser according to said information provided by said data signal;

transmitting said sequence of pressure pulses to a pressure transducer in fluid communication with said mud-pulser; and transmitting a second data signal from said pressure transducer to said surface receiver.

10. The method according to claim 9 wherein generating said EM signal comprises decoding said data signal and modulating a decoded signal to produce said EM signal.

11. The method according to claim 10 wherein said data signal is M-ary encoded.

12. The method according to claim 9 wherein said instructing is performed by downlinking to said EM tool.

13. The method according to claim 9 comprising utilizing a current sensing module in said EM tool to apply current limiting to conserve power.

14. The method according to claim 9 comprising the step of receiving said EM signal or said second data signal and performing one or more filtering stages and one or more amplification stages to produce a conditioned signal prior to providing said EM signal or said second data signal to said surface receiver.

15. The method according to claim 9 comprising the step of using a vibration switch to switch between a static mode for surveying operations and a dynamic mode for drilling operations.

16. A measurement while drilling (MWD) tool for transmitting data in a wellbore, said wellbore having a drill string, said tool comprising:

a controller for intercepting via an interface between said controller and a mud pulse tool, a data signal indicative of at least one parameter acquired from at least one sensor, said data signal normally provided by said mud pulse tool to a mud pulser;

a surface receiver;

an EM transmitter for generating an EM signal according to information provided by said data signal, said EM signal being modulated to provide a substantially square waveform to mimic a mud pulse signal and being transmitted by said EM transmitter to said surface receiver;

said mud-pulser for generating a sequence of pressure pulses according to information provided by said data signal and for transmitting said sequence of pressure pulses through a mud-column in said drill string to a pressure transducer, said pressure transducer being in communication with said surface receiver; and a switching mechanism interposed between said controller and said EM transmitter and said mud-pulser, said switching mechanism being capable of directing said data signal to either said EM transmitter or said mud-pulser in response to a control signal generated by said controller.

17. The tool according to claim 16 wherein generating said EM signal comprises decoding said data signal and modulating a decoded signal to produce said substantially square waveform.

18. The tool according to claim 17 wherein said data signal is M-ary encoded.

19. The tool according to claim 16 wherein said controller is instructed from the surface by downlinking to said controller.

20. The tool according to claim 16 wherein said EM transmitter comprises a current sensing module to apply current limiting for conserving power.

21. The tool according to claim 16 wherein said surface receiver comprises one or more filtering stages and one or more amplification stages to produce a conditioned signal.

22. The tool according to claim 16 comprising a vibration switch operable to switch between a static mode for surveying operations and a dynamic mode for drilling operations.

23. An EM measurement while drilling (MWD) tool for transmitting data in a wellbore, said wellbore having a drill string, said tool comprising:

a controller for intercepting a data signal normally provided by a mud pulse tool to a mud pulser, said data signal indicative of at least one parameter acquired by said mud pulse tool from at least one sensor;

an interface between said controller and said mud pulse tool for enabling said controller to intercept said data signal; and an EM transmitter for generating an EM signal according to information provided by said data signal, said EM signal being modulated to provide a substantially square waveform to mimic a mud pulse signal and being transmitted by said transmitter to a surface receiver.

24. The tool according to claim 23 further comprising said surface receiver which comprises an EM receiver module for receiving said EM signal and a mud pulse receiver module connected to said EM receiver module, said surface receiver being configured for: receiving said EM signal at said EM receiver module, having said EM receiver module condition said EM signal, and having said EM receiver module input said conditioned signal to said mud pulse receiver module; wherein said mud pulse receiver module operates according to mud-pulse telemetry.

25. The tool according to claim 23 wherein generating said EM signal comprises decoding said data signal and modulating a decoded signal to produce said EM signal.

26. The tool according to claim 25 wherein said data signal is M-ary encoded.

27. The tool according to claim 23 wherein said controller comprises a downlinking module for receiving control signals via downlinking from the surface.

28. The tool according to claim 23 wherein said EM transmitter comprises a current sensing module to apply current limiting for conserving power.

29. The tool according to claim 24 wherein said EM receiver module comprises one or more filtering stages and one or more amplification stages to produce a conditioned signal for said surface receiver.

30. The tool according to claim 23 comprising a vibration switch to switch between a static mode for surveying operations and a dynamic mode for drilling operations.

31. The tool according to claim 24 further comprising a multiplexer for redirecting said data signal to a mud-pulser upon receiving an instruction from said surface receiver module.

32. A method for adapting a mud pulse measurement while drilling (MWD) tool to utilize electromagnetic (EM) telemetry, said mud pulse MWD tool comprising a mud pulser for generating a sequence of pressure pulses according to information provided by a data signal indicative of at least one parameter acquired from at least one sensor and a surface receiver, said method comprising:

providing an EM transmitter configured to interface with said mud pulse MWD tool to intercept said data signal normally provided to said mud pulser downhole in a wellbore;

interfacing said EM transmitter with said mud pulse MWD tool to enable said data signal to be obtained by said EM transmitter, to enable an EM signal to be generated using said data signal and to enable said EM signal to be transmitted from said EM transmitter to said surface receiver;

providing an EM receiver module configured to obtain said EM signal and condition said EM signal to be compatible with said surface receiver; and interfacing said EM receiver module with said surface receiver to provide a conditioned signal to said surface receiver that mimics a mud-pulse signal.

33. The method according to claim 32 wherein generation of said EM signal comprises decoding said data signal and modulating a decoded signal to produce said EM signal.

34. The method according to claim 33 wherein said data signal is M-ary encoded.

35. The method according to claim 32 comprising controlling transmission of said EM signal downhole by downlinking to said EM transmitter.

36. The method according to claim 32 comprising utilizing a current sensing module to apply current limiting in generation of said EM signal to conserve power.

37. The method according to claim 32 wherein generating said conditioned signal comprises performing one or more filtering stages and one or more amplification stages.

38. The method according to claim 32 comprising the step of using a vibration switch to switch between a static mode for surveying operations and a dynamic mode for drilling operations.

39. A system for adapting a mud pulse measurement while drilling (MWD) tool to utilize electromagnetic (EM) telemetry, said mud pulse MWD tool comprising a mud pulser for generating a sequence of pressure pulses according to information provided by a data signal indicative of at least one parameter acquired from at least one sensor and a surface receiver, said system comprising:

an EM transmitter configured to interface with said mud pulse MWD tool to intercept said data signal normally provided to said mud pulser downhole in a wellbore, configured to obtain said data signal, configured to generate an EM signal using said data signal and configured to transmit said EM signal from said EM transmitter to said surface receiver;

an EM receiver module configured to obtain said EM signal, configured to condition said EM signal to be compatible with said surface receiver and configured to interface with said surface receiver to provide a conditioned signal to said surface receiver that mimics a mud-pulse signal; and a power supply to provide power to said EM transmitter while downhole.

40. The system according to claim 39 wherein generation of said EM signal comprises decoding said data signal and modulating a decoded signal to produce said EM signal.

41. The system according to claim 40 wherein said data signal is M-ary encoded.

42. The system according to claim 39 comprising a downlinking module for controlling transmission of said EM signal downhole by receiving a downlink signal from the surface.

43. The system according to claim 39 wherein said EM transmitter comprises a current sensing module to apply current limiting in generation of said EM signal to conserve power.

44. The system according to claim 39 wherein said EM surface receiver one or more filtering stages and one or more amplification stages for conditioning said EM signal.

45. The system according to claim 39 comprising a vibration switch for switching between a static mode for surveying operations and a dynamic mode for drilling operations.

46. A dual telemetry measurement while drilling (MWD) system capable of transmitting data in a wellbore to a surface receiver using either or both electromagnetic (EM) telemetry and mud-pulse telemetry, said system comprise;

an EM transmitter configured to interface with a mud pulse tool to intercept a data signal normally provided to a mud pulser downhole in a wellbore, configured to generate an EM signal using said data signal and configured to transmit said EM signal from said EM transmitter to a surface receiver, said data signal indicative of at least one parameter acquired by said mud pulse tool from at least one sensor;

a power supply to provide power to said EM transmitter while downhole;

a first switching circuit configured to direct said data signal to said EM transmitter for operating in an EM telemetry mode and configured to direct said data signal to said mud-pulser for operating in a mud-pulse telemetry mode;

an EM receiver module configured to obtain said EM signal and configured to condition said EM signal to be compatible with said surface receiver;

a second switching circuit configured to direct a conditioned signal to said surface receiver in said EM telemetry mode and configured to direct a mud-pulse signal provided by a transducer to said surface receiver in said mud-pulse telemetry mode; and control logic for operating said switching circuits to switch between said telemetry modes.

47. The system according to claim 46 wherein said conditioned signal mimics said mud-pulse signal.

48. The system according to claim 46 comprising said mud-pulser and said surface receiver.

49. The system according to claim 48 wherein said surface receiver is part of an existing mud-pulse tool.

50. The system according to claim 46 wherein generation of said EM signal comprises decoding said data signal and modulating a decoded signal to produce said EM signal.

51. The system according to claim 50 wherein said data signal is M-ary encoded.

52. The system according to claim 46 comprising a downlinking module for controlling transmission of said EM signal downhole by receiving a downlink signal from the surface.

53. The system according to claim 46 wherein said EM transmitter comprises a current sensing module to apply current limiting in generation of said EM signal to conserve power.

54. The system according to claim 46 wherein said EM surface receiver one or more filtering stages and one or more amplification stages for conditioning said EM signal.

55. The system according to claim 46 comprising a vibration switch for switching between a static mode for surveying operations and a dynamic mode for drilling operations.

* * * * *